United States Patent
Emerson et al.

[15] 3,683,000
[45] Aug. 8, 1972

[54] POLYHALO ETHYL- AND POLYHALO VINYL-DITHIOETHYL CARBONATES AND THIO CARBONATES

[72] Inventors: Carl D. Emerson, Kansas City, Mo.; Paul C. Aichenegg, Prairie Village, Kans.

[73] Assignee: Baychem Corporation, New York, N.Y.

[22] Filed: March 27, 1969

[21] Appl. No.: 811,233

Related U.S. Application Data

[60] Division of Ser. No. 757,487, Sept. 4, 1968, which is a continuation-in-part of Ser. No. 560,125, June 24, 1966, abandoned.

[52] U.S. Cl. ..........260/463, 260/247.1, 260/293.85, 260/326.3, 260/326.82, 260/399, 260/455 A, 260/455 B, 260/455 R, 260/469, 260/471 C, 260/473 C, 260/476 R, 260/475 R, 260/475 P, 260/482 B, 260/482 C, 260/485 J, 260/488 H, 260/488 J, 260/488 R, 260/608, 260/609 R, 71/88, 71/94, 71/95, 71/98, 71/100, 424/248, 424/308, 424/309, 424/267, 424/311, 424/312, 424/274, 424/336, 424/286, 424/300, 424/301

[51] Int. Cl...C07c 149/12, C07c 154/00, A01n 9/12

[58] Field of Search ..........................260/455 B, 463

[56] References Cited

UNITED STATES PATENTS

| | | | |
|---|---|---|---|
| 3,141,045 | 7/1964 | Aichenegg et al. | 260/608 |
| 3,174,897 | 3/1965 | Aichenegg et al. | 424/366 |
| 3,203,996 | 8/1965 | Moore | 260/608 |

*Primary Examiner*—Lewis Gotts
*Assistant Examiner*—Diana G. Rivers
*Attorney*—Cushman, Darby & Cushman

[57] ABSTRACT

Compounds are prepared having one of the formulas (1) A—S S CH$_2$CHOH
        |
        B (2)

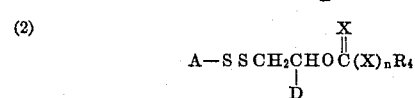

(3) (A—S S CH$_2$CH$_2$O)$_2$C=X (4)

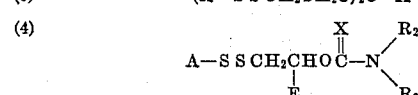

(5)

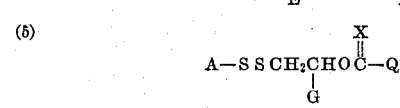

and (6) A—SSCH$_2$CH$_2$—K where
A is selected from the group consisting of di to tetrahaloethyl and di to trihalovinyl;
B is selected from the group consisting of hydrogen and —CH$_2$OH;
D is selected from the group consisting of hydrogen and

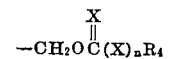

E is selected from the group consisting of hydrogen and

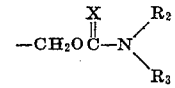

G is selected from the group consisting of hydrogen and

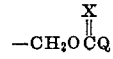

$n$ is 0 or 1,
X is selected from the group consisting of oxygen and sulfur except that when $n$ is 0 in formula (2) X must be oxygen;
Q is halogen;
R$_1$ is selected from the group consisting of alkyl, phenyl, lower alkyl phenyl, halo lower alkyl, halophenyl, naphthyl, lower alkyl naphthyl and lower alkyl halophenyl;
R$_2$ and R$_3$ individually are the same as R$_1$ or hydrogen with the proviso that not more than one of R$_2$ and R$_3$ is hydrogen and collectively together with the adjacent nitrogen atom form a five to six membered heterocyclic ring having up to 1 oxygen atom therein;
R$_4$ is R$_1$ or

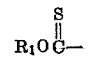

or phenyl ethylene or halophenoxymethyl having up to 3 halogens and up to 1 methyl group on the aromatic ring;
K is selected from the group consisting of

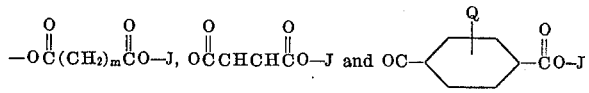

J is selected from the group consisting of hydrogen and ASSCH$_2$CH$_2$—;
$m$ is an integer from 0 to 2 inclusive, and all halogen atoms in the compounds have an atomic weight of 35 to 80.

The compounds are useful as herbicides, fungicides, nematocides, defoliants and desiccants. 1,2,2-trichloroethyl-dithioethyl-2'-methyl-4'-chlorophenoxy acetate is a particularly effective herbicide.

7 Claims, No Drawings

POLYHALO ETHYL- AND POLYHALO VINYL-DITHIOETHYL CARBONATES AND THIO CARBONATES

This application is a division of Ser. No. 757,487, filed Sept. 4, 1968, which application is a continuation-in-part of Ser. No. 560,125, filed June 24, 1966 and now abandoned.

The present invention relates to novel polyhalo disulfide alcohols and derivatives thereof.

It is an object of the present invention to prepare novel polyhalo ethyl or vinyl disulfide alcohols and derivatives thereof.

Another object is to prepare novel polyhalo ethyl or vinyl dithioethyl chloroformate group containing organic compounds which are useful as intermediates in making other compounds.

A further object is to prepare novel fungicides.

An additional object is to prepare novel nematocides.

Yet another object is to prepare novel defoliants and desiccants.

A still further object is to prepare post emergent herbicides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing a compound having one of the following formulas:

(1)  A S S CH$_2$CHOH
             |
             B (2)  $$\text{A S S CH}_2\text{CHO}\overset{\overset{X}{\|}}{C}(X)_n R_4$$
              |
              D (3)  (A S S CH$_2$CH$_2$O)$_2$C=X (4)  $$\text{A S S CH}_2\text{CHO}\overset{\overset{X}{\|}}{C}-N\overset{R_2}{\underset{R_3}{\diagdown}}$$
              |
              E (5)  $$\text{A S S CH}_2\text{CHO}\overset{\overset{X}{\|}}{C}-Q$$
              |
              G and
where
A is selected from the group consisting of di to tetrahaloethyl and di to trihalovinyl;
B is selected from the group consisting of hydrogen and —CH$_2$OH;
D is hydrogen or

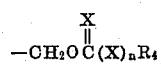

E is hydrogen or

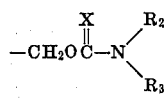

G is hydrogen or

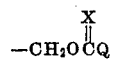

$n$ is 0 or 1;
X is oxygen or sulfur except that when $n$ is 0 in formula (2) X must be oxygen;
Q is halogen;
R$_1$ is alkyl, phenyl, lower alkyl phenyl, phenyl ethylene, halo lower alkyl, halophenyl, naphthyl, lower alkyl naphthyl or lower alkyl halophenyl;
R$_2$ and R$_3$ individually are the same as R$_1$ or hydrogen with the proviso that not more than one of R$_2$ and R$_3$ is hydrogen and collectively with the adjacent nitrogen atom form a five to six membered heterocyclic ring having up to 1 oxygen atom therein;
R$_4$ is R$_1$ or

or phenyl ethylene or phenoxymethyl having up to 3 halogen atoms and up to 1 methyl group on the aromatic ring;

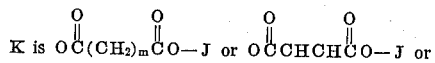

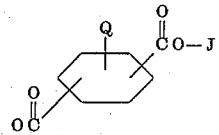

where
J is hydrogen or ASSCH$_2$CH$_2$—;
$m$ is an integer from 0 to 2 inclusive and all halogen atoms in the compounds have an atomic weight of 35 to 80, i.e. are chlorine or bromine.

Preferably all halogen atoms are chlorine and preferably any alkyl group is a lower alkyl group, most preferably having one to four carbon atoms. The preferred compounds are those where A is trichloroethyl or dichlorovinyl.

The compounds of the present invention are useful as fungicides, nematocides, defoliants and desiccants, e.g. for cotton and beans, post emergent herbicides, pre-emergent herbicides, bactericides, etc.

The compounds of formula (1) also are useful in preparing the compounds of formulas (2), (3), (4), (5) and (6) and other compounds.

The compounds of formula (5) are useful in preparing the compounds of formula (2) which are carbonates or thiol carbonates and as intermediates in making other compounds.

The compounds of formula (1) are prepared by reacting the corresponding sulfenyl halides with the appropriate mercapto alcohol. As sulfenyl halides there can be used 1,2,2-trichloroethyl sulfenyl chloride, 2,2,2-trichloroethyl sulfenyl chloride, 2,2-dichloroethyl sulfenyl chloride, 1,2-dichloroethyl sulfenyl chloride, 1,2,2,2-tetrachloroethyl sulfenyl chloride, 1,2,2-tribromoethyl sulfenyl chloride, 2,2-dichlorovinyl sulfenyl, chloride, 1,2-dichlorovinyl sulfenyl chloride, 2,2-dibromovinyl sulfenyl bromide, 1,2,2-trichlorovinyl sulfenyl chloride.

As the mercaptoalcohol there can be used 2-mercaptoethanol or monothioglycerol (3-mercapto1,2-dihydroxypropane).

The unsaturated halodisulfide alcohols of formula (1) can also be prepared by dehydrohalogenation of the appropriate polyhaloethyl β-hydroxyethyl disulfide. Examples of compounds within formula (1) are 1,2,2-trichloroethyl-β-hydroxyethyl disulfide, 2,2,2-trichloroethyl-β-hydroxyethyl disulfide, 1,2,2-trichloroethyl-2',3'-dihydroxypropyl disulfide, 2,2,2-trichloroethyl-2',3'-dihydroxy-propyl disulfide, 2,2-dichlorovinyl-β-hydroxyethyl disulfide, 2,2-dichlorovinyl-2'.3'-dihydroxypropyl disulfide, 1,2,2,2-tetrachloroethyl-β-hydroxyethyl disulfide, 2,2-dichloroethyl-β-hydroxyethyl disulfide, 1,2,2-trichlorovinyl-β-hydroxyethyl disulfide, 1,2,2,2-tetrachloroethyl-2',3'-dihydroxypropyl disulfide, 1,2-dichloroethyl-2',3'-dihydroxypropyl disulfide, 1,2-dichlorovinyl-β-hydroxyethyl disulfide, 1,2,2-trichlorovinyl-2',3'-dihydroxypropyl disulfide, 1,2,2-tribromoethyl-β-hydroxyethyl disulfide, 2,2-dibromovinyl-β-hydroxyethyl disulfide, 2,2,2-tribromoethyl-2',3'-hydroxypropyl disulfide and 2,2-dibromovinyl-2',3'-dihydroxypropyl disulfide.

The compounds of formula (2) which are esters (other than carbonates, thiol carbonates and dithiocarbonates) are prepared by reacting an acyl halide, e.g. an acyl chloride or acyl bromide, with the appropriate alcohol of formula (1).

Examples of suitable acyl halides are acetyl chloride, chloroacetyl chloride, acetyl bromide, dichloroacetyl chloride, trichloroacetyl chloride, proplonyl chloride, butyryl chloride, valeryl chloride, caproyl chloride, caprylyl chloride, benzoyl chloride, p-chlorobenzoyl chloride, 2,4-dichlorobenzoyl chloride, 2,4,5-trichlorobenzoyl chloride, toluyl chloride, 2-butylbenzoyl chloride, cinnamoyl chloride, 2-methyl-4-chlorobenzoyl chloride, m-bromobenzoyl bromide, α-naphthoyl chloride, β-naphthoyl chloride, β-methyl α-naphthoyl chloride, chloropropionyl chloride, 2,4-dichlorophenoxyacetyl chloride, 2,4,5,trichlorophenoxyacetyl chloride, 2-methyl-4-chlorophenoxyacetyl chloride, 2-methyl-4-bromophenoxyacetyl chloride, 2,4,5-tribromophenoxyacetyl chloride, 2,4-dichloro-5-bromophenoxyacetyl chloride.

Examples of esters within formula (2) are 1,2,2-trichloroethyl dithioethyl acetate, 2,2,2-trichloroethyl dithioethyl acetate, 2,2-dichlorovinyl dithioethyl acetate, 1,2,2-trichloroethyl-2',3'-diacetoxypropyl disulfide, 2,2,2-trichloroethyl-2',3'-diacetoxypropyl disulfide, 2,2-dichlorovinyl-2',3'-diacetoxypropyl disulfide, 1,2-dichlorovinyl-2',3'-diacetoxypropyl disulfide, 1,2-dichlorovinyl dithioethyl acetate, 1,2-dichloroethyl dithioethyl acetate, 1,2,2,2-tetrachloroethyl dithioethyl acetate, 1,2,2-trichlorovinyl dithioethyl acetate, 1,2,2-trichlorovinyl-2',3'-diacetoxypropyl disulfide, 1,2,2-tribromoethyl dithioethyl acetate, 2,2-dibromovinyl dithioethyl acetate, 2,2,2-tribromoethyl-2',3'-diacetoxypropyl disulfide, 1,2,2-trichloroethyl dithioethyl propionate, 2,2,2-trichloroethyl dithioethyl propionate, 2,2-dichlorovinyl dithioethyl propionate, 1,2,2-trichloroethyl-2',3'-dipropionoxypropyl disulfide, 2,2,2-trichloroethyl-2',3'-dipropionoxypropyl disulfide, 2,2-dichlorovinyl-2',3'-dipropionoxypropyl disulfide, 1,2,2-trichloroethyldithioethyl butyrate, 2,2,2-trichloroethyl dithioethyl butyrate, 2,2-dichlorovinyl dithioethyl butyrate, 1,2,2-trichlorovinyl dithioethyl butyrate, 1,2,2-trichloroethyl-2',3'-dibutyryloxypropyl disulfide, 2,2-dichlorovinyl-2',3'-dibutyryloxypropyl disulfide, 2,2,2-trichloroethyl dithioethyl valerate, 1,2,2-trichloroethyl dithioethyl decanoate, 2,2-dichlorovinyl dithioethyl caprylate, 1,2,2-trichloroethyl-2',3'-didecanoyloxypropyl disulfide, 1,2,2-trichloroethyl dithioethyl chloroacetate, 2,2,2-trichloroethyl dithioethyl chloroacetate, 2,2-dichlorovinyl dithioethyl chloroacetate, 2,2-dichlorovinyl dithioethyl chloroacetate, 1,2,2-trichloroethyl-2',3'-di(chloroacetyloxy)propyl disulfide, 2,2-dichlorovinyl-2',3'-di(chloroacetyloxy)propyl disulfide, 1,2,2-trichloroethyl dithioethyl dichloroacetate, 2,2-dichlorovinyl dithioethyl trichloroacetate, 2,2,2-trichloroethyl-2',3'-di(trichloroacetyloxy) propyl disulfide, 1,2,2-trichloroethyl dithioethyl benzoate, 2,2,2-trichloroethyl dithioethyl benzoate, 1,2,2,2-tetrachloroethyl dithioethyl benzoate, 2,2-dichlorovinyl dithioethyl benzoate, 2,2,2-tribromoethyl dithioethyl benzoate, 1,2,2-trichloroethyl-2',3'-dibenzoyloxypropyl disulfide, 2,2,2-trichloroethyl-2',3'-dibenzoyloxypropyl disulfide, 2,2-dichlorovinyl-2',3'-dibenzoyloxypropyl disulfide, 1,2,2-trichloroethyl dithioethyl 4-chlorobenzoate, 2,2-dichlorovinyl dithioethyl 2,4-dichlorobenzoate, 2,2,2-trichloroethyl dithioethyl 2,4,5-trichlorobenzoate, 1,2,2-trichloroethyl dithioethyl 2,4,5-trichlorophenoxyacetate, 2,2-dichlorovinyl dithioethyl 2,4-dichlorophenoxyacetate, 2,2,2-trichloroethyl-2',3'-di (2",4",5"-trichlorobenzoyloxy)propyl disulfide, 1,2,2-trichloroethyl dithioethyl 4-butylbenzoate, 2,2,2-trichloroethyl dithioethyl 2'-methyl-4'-chlorobenzoate, 2,2-dichlorovinyl dithioethyl cinnamate, 1,2,2-trichloroethyl-2',3'-di(cinnamoyloxyl)propyl disulfide, 2,2,2-trichloroethyl dithioethyl α-naphthoate, 2,2-dichlorovinyl dithioethyl β-naphthoate, 1,2,2-trichloroethyl dithioethyl α-methyl β-naphthoate, 2,2-dichlorovinyl-2',3'-di α-naphthoyloxypropyl disulfide, 1,2,2-tribromoethyl dithioethyl 4-bromobenzoate, 1,2,2-trichloroethyldithioethyl-2'-methyl-4'-chlorophenoxyacetate, 2,2,2-trichloroethyldithioethyl-2'-methyl-4'-chlorophenoxyacetate, 2,2-dichlorovinyldithioethyl-2'-methyl-4'-chlorophenoxyacetate, 1,2,2-tribromoethyldithioethyl-2'-methyl-4'-bromophenoxyacetate, 2,2,2-trichloroethyldithioethyl 2,4,5-trichlorophenoxyacetate, 2,2-dichlorovinyl 2,4,5-trichlorophenoxyacetate, 1,2,2-trichloroethyldithioethyl 2,4-dichlorophenoxyacetate, 2,2,2-trichloroethyldithioethyl 2,4-dichlorophenoxyacetate, 1,2,2-trichloroethyldithioethyl trichloroacetate, 1,2,2-trichloroethyldithioethyl cinnamate, 1,2,2-trichloroethyldithioethyl phenoxyacetate, 2,2-dichlorovinyldithioethyl phenoxyacetate, 2,2,2-trichloroethyldithioethyl cinnamate, 1,2,2-trichloroethyl-2',3'-di (2''',4''',5'''-trichlorophenoxyacetyloxy) propyl disulfide, 1,2,2-trichlorovinyldithioethyl-2'-methyl-4'-chlorophenoxyacetate, 2,2,2-trichloroethyl-2',3'-di(2''',4'''-dichlorophenoxyacetyloxy) propyl disulfide, 2,2-dichlorovinyl-2',3'-di (2'',4''',5'''-trichlorophenoxyacetyloxy) propyl disulfide, 1,2,2-trichloroethyl-2',3'-di (2''-methyl-4''- chlorophenoxyacetyloxy) propyl disulfide, 2,2,2-trichloroethyl-2',3'-di (2''-methyl-4'''-chlorophenoxyacetyloxy) propyl disulfide, 2,2-dichlorovinyl-2',3'-di (2''-methyl-4''-chlorophenoxyacetyloxy) propyl disulfide, 1,2-dichlorovinyldithioethyl-2'-methyl-4'-chlorophenoxyacetate, 1,2,2,2-tetrachloroethyldithioethyl-2'-methyl-4'-chlorophenoxy-acetate, 1,2,2,2-tetrachloroethyldithioethyl-2',4'-dichlorophenoxyacetate, 1,2,2,2-tetrachloroethyldithioethyl 2',4',5'-trichlorophenoxyacetate.

The compounds of formula (2) which are carbonates, thiol carbonates and dithiocarbonates are made by one of the following three methods:

II (a) reacting the appropriate alcohol of formula (1) with the appropriate alkyl or aryl chloroformate;

II (b) reacting the appropriate disulfide chloroformate of formula (5) with the appropriate alkyl alcohol, aryl alcohol, phenol or mercaptan or xanthate;

II (c) reacting the appropriate polyhaloethyl or polyhalovinyl sulfenyl halide, e.g. any of those previously set forth, with a mercaptocarbonate.

Examples of suitable chloroformates for reaction II (a) are methyl chloroformate, ethyl chloroformate, propyl chloroformate, butyl chloroformate, isobutyl chloroformate, hexyl chloroformate, cyclohexyl chloroformate, octyl chloroformate, dodecyl chloroformate, phenyl chloroformate, 4-methylphenyl chloroformate, 4-chlorophenyl chloroformate, α-naphthyl chloroformate, β-naphthyl chloroformate, 2-bromophenyl chloroformate, 2-chloroethyl chloroformate, 3-butylphenyl chloroformate, methyl chlorothiol formate, ethyl chlorothiol formate, isopropyl chlorothiol formate, butyl chlorothiol formate, amyl chlorothiol formate, phenyl chlorothiol formate, 2,4-dimethylphenyl chlorothiol formate, β-naphthyl chlorothiol formate.

Examples of suitable alcohols, phenols, mercaptans and xanthates for use in reaction II (b) are methyl alcohol, ethyl alcohol, isopropyl alcohol, propyl alcohol, butyl alcohol, sec. butyl alcohol amyl alcohol, cyclohexyl alcohol, hexyl alcohol, octyl alcohol, isooctyl alcohol, dodecyl alcohol, phenol, m-cresol, o-cresol, p-cresol, benzyl alcohol, p-chlorophenol, α-naphthol, β-naphthol, α-methyl-β-naphthol, methyl mercaptan, ethyl mercaptan, propyl mercaptan, dodecyl mercaptan, butyl mercaptan, cyclohexyl mercaptan, amyl mercaptan, benzyl mercaptan, thiophenol, p-thiocresol, α-naphthyl mercaptan, ethylene chlorohydrin, propylene chlorohydrin, potassium ethyl xanthate, sodium ethyl xanthate, potassium butyl xanthate, potassium methyl xanthate. The disulfide chloroformates which can be employed are set forth infra.

Examples of suitable mercaptocarbonates for reaction II (c) are ethyl-2-mercaptoethyl carbonate, methyl-2-mercaptoethyl carbonate, propyl-2-mercaptoethyl carbonate, butyl-2-mercaptoethyl carbonate, hexyl-2-mercaptoethyl carbonate, cyclohexyl-2-mercaptoethyl carbonate, phenyl-2-mercaptoethyl carbonate, p-tolyl-2-mercaptoethyl carbonate, α-naphthyl-2-mercaptoethyl carbonate.

Examples of carbonates, thiol carbonates and dithiocarbonates within formula (2) are 1,2,2-trichloroethyl dithioethyl-ethyl carbonate, 2,2,2-trichloroethyl dithioethyl-ethyl carbonate, 1,2,2-trichloroethyl dithioethyl-phenyl carbonate, 2,2,2-trichloroethyl dithioethyl-phenyl carbonate, 2,2-dichlorovinyl dithioethyl-ethyl carbonate, 2,2-dichlorovinyl dithioethyl-phenyl carbonate, 1,2,2,2-tetrachloroethyl tetrachloroethyl dithioethyl-ethyl carbonate, 1,2,2-trichlorovinyl dithioethyl-ethyl carbonate, 2,2,2-tribromoethyl dithioethyl-ethyl carbonate, 2,2-di-bromovinyl dithioethyl-phenyl carbonate, 1,2-dichloroethyl dithioethyl-ethyl carbonate, 1,2,2-trichloroethyl dithioethyl-methyl carbonate, 2,2,2-trichloroethyl dithioethyl-ethyl carbonate, 1,2-dichlorovinyl dithioethyl-methyl carbonate, 2,2-dichlorovinyl dithioethyl-methyl carbonate, 2,2,2-trichloroethyl dithioethyl-propyl carbonate, 1,2,2-trichloroethyl dithioethyl-isopropyl carbonate, 2,2-dichlorovinyl dithioethyl-propyl carbonate, 1,2,2-trichloroethyl dithioethyl-butyl carbonate, 2,2,2-trichloroethyl dithioethyl-butyl carbonate, 2,2-dichlorovinyl dithioethyl-butyl carbonate, 1,2,2-trichloroethyl dithioethyl sec. butyl carbonate, 2,2,2-trichloroethyl dithioethyl-amyl carbonate, 2,2-dichlorovinyl dithioethyl-amyl carbonate, 1,2,2-trichloroethyl dithioethyl-hexyl carbonate, 2,2-dichlorovinyl dithioethylcyclohexyl carbonate, 2,2,2-trichloroethyl dithioethyl-cyclohexyl carbonate, 1,2,2-trichloroethyl dithioethyl-octyl carbonate, 2,2,2-trichloroethyl dithioethyl-dodecyl carbonate, 2,2-dichlorovinyl dithioethyl-dodecyl carbonate, 1,2,2-trichloroethyl dithioethyl-p-tolyl carbonate, 2,2,2-trichloroethyl dithioethyl-o-tolyl carbonate, 2,2-dichlorovinyl dithioethyl-m-tolyl carbonate, 1,2,2-trichloroethyl dithioethyl-p-butylphenyl carbonate, 2,2,2-trichloroethyl dithioethyl-β-naphthyl carbonate, 2,2-dichlorovinyl dithioethyl-α-naphthyl carbonate, 1,2,2-trichloroethyl dithioethyl-2'-chloroethyl carbonate, 1,2,2-trichloroethyl dithioethyl-p-chlorophenyl carbonate, 2,2,2-tribromoethyl dithioethyl-o-bromophenyl carbonate, 2,2-dichlorovinyl dithioethyl-m-chlorophenyl carbonate, 2,2,2-trichloroethyl dithioethyl-2',4'5'-trichlorophenyl carbonate, 2,2-dichlorovinyl dithioethyl-2'-methyl-4'-chlorophenyl carbonate, 1,1,2-trichloro-3,4-dithiaheptane-6,7-di (ethyl carbonate), 1,1,1-trichloro-3,4-dithiaheptane-6,7-di (methyl carbonate), 1,1-dichloro-3,4-dithiaheptene-1,6,7-di (ethyl carbonate), 1,1,2-trichloro-3,4-dithiaheptane-6,7-di (propyl carbonate), 1,1,1-trichloro-3,4-dithiaheptane-6,7-di (butyl carbonate), 1,1-dichloro-3,4-dithiaheptene-1,6,7-di (propyl carbonate), 1,1,2-trichloro-3,4-dithiaheptane-6,7-di (phenyl carbonate), 1,1,2-trichloro-3,4-dithiaheptane-6,7-di (phenyl carbonate), 1,1-dichloro-3,4-dithiaheptene-1,6,7-di (phenyl carbonate), 1,1-dichloro-3,4-dithiaheptene-1,6,7-di (α-naphthyl carbonate), 1,1,1-trichloro-3,4-dithiaheptane-6,7-di (p-chlorophenyl carbonate), 1,2,2-trichloroethyl dithioethyl-S-ethyl thiol carbonate, 2,2,2-trichloroethyl dithioethyl-S-ethyl thiol carbonate,' 2,2-dichlorovinyl dithioethyl-S-ethyl thiol carbonate, 2,2,2-tribromoethyl dithioethyl-S-ethyl thiol carbonate, 2,2-dibromovinyl dithioethyl-S-ethyl thiol carbonate, 1,2,2-trichloroethyl dithioethyl-S methyl thiol carbonate, 2,2-dichlorovinyl dithioethyl-S-methyl thiol carbonate, 2,2,2-trichloroethyl dithioethyl-S-propyl thiol carbonate, 1,2,2-trichlorovinyl dithioethyl-S-amyl thiol carbonate, 1,2,2,2-tetrachloroethyl dithioethyl-S-hexyl thiol carbonate, 1,2,2-trichloroethyl dithioethyl-S-butyl thiol carbonate, 2,2,2-trichloroethyl dithioethyl-S-butyl thiol carbonate, 2,2-dichlorovinyl dithioethyl-S-butyl thiol carbonate, 1,2,2-trichloroethyl dithioethyl-S-octyl thiol carbonate, 1,2,2-trichloroethyl dithioethyl-S-phenyl thiol carbonate, 2,2,2-trichloroethyl dithioethyl-S-phenyl thiol carbonate, 2,2-dichlorovinyl dithioethyl-S-phenyl thiol carbonate, 1,2,2-trichloroethyl dithioethyl-S-o-tolyl thiol carbonate, 2,2-dichlorovinyl dithioethyl-S-p-tolyl thiol carbonate, 2,2,2-trichloroethyl dithioethyl-S-α-naphthyl thiol carbonate, 2,2-dichlorovinyl dithioethyl-S-2',4'-dichlorophenyl thiol carbonate, 2,2-dichlorovinyl dithioethyl-S-2'-chloroethyl thiol carbonate, 1,1,2-trichloro-3,4-dithiaheptane-6,7-di (ethyl thiol carbonate), 1,1,1-trichloro-3,4-dithiaheptane-6,7-di (ethyl thiol carbonate), 1,1-dichloro-3,4-dithiaheptene-1,6,7-di (ethyl thiol carbonate), 1,1,1-trichloro-3,4-dithiaheptane-6,7-di (methyl thiol carbonate), 1,1-dichloro-3,4-dithiaheptene-1,6,7-di (methyl thiol carbonate), 1,1,1-trichloro-3,4-dithiaheptane-6,7-di (butyl thiol carbonate), 1,1-dichloro-3,4-dithiaheptene-1,6,7-di (Butyl thiol carbonate), 1,1,1-trichloro-3,4-dithiaheptane-6,7-di (phenyl thiol carbonate), 1,1-dichloro-3,4-dithiaheptene-1,6,7-di (phenyl thiol carbonate), 1,1,2-trichloro-3,4-dithiaheptane-6,7-di (2'-chloro-4'-methylphenyl thiol carbonate), 1,1-dichloro-3,4-dithiaheptene-1,6,7-di (β-naphthyl thiol carbonate), 1,2,2-trichloroethyl dithioethyl-S-ethyl dithio carbonate, 2,2,2-trichloroethyl dithioethyl-S-ethyl dithio carbonate, 2,2-dichlorovinyl dithioethyl-S-ethyl dithio carbonate, 1,2-dichlorovinyl dithioethyl-S-ethyl dithio carbonate, 2,2,2-tribromoethyl dithioethyl-S-ethyl dithio carbonate, 2,2-dibromovinyl dithioethyl-S-ethyl dithio carbonate, 1,2,2-trichloroethyl dithioethyl-S-methyl dithio carbonate, 2,2-dichlorovinyl dithioethyl-S-methyl dithio carbonate, 2,2-trichloroethyl dithioethyl-S-propyl dithio carbonate, 1,2,2-trichlorovinyl dithioethyl-S-heptyl dithio carbonate, 1,2,2,2-tetrachloroethyl dithioethyl-S-hexyl dithio carbonate, 1,2,2-trichloroethyl dithioethyl-S-butyl dithio carbonate, 2,2,2-trichloroethyl dithioethyl-S-butyl dithio carbonate, 2,2-dichlorovinyl dithioethyl-S-butyl dithio carbonate, 1,2,2-trichloroethyl dithioethyl-S-octyl dithio carbonate, 1,2,2-trichloroethyl dithioethyl-S-phenyl dithio carbonate, 2,2,2-trichloroethyl dithioethyl-S-phenyl dithio carbonate, 2,2-dichlorovinyl dithio ethyl-S-phenyl dithio carbonate, 1,2,2-trichloroethyl dithioethyl-S-p-tolyl dithio carbonate, 2,2-dichlorovinyl dithioethyl-S-o-tolyl dithio carbonate, 2,2,2-trichloroethyl dithioethyl-S-α-naphthyl dithio carbonate, 2,2-dichlorovinyl dithioethyl-S-2',4'-dichlorophenyl dithio carbonate, 2,2-dichlorovinyl dithioethyl-S-2'-chloroethyl dithio carbonate, 1,1,2-trichloro-3,4-dithiaheptane-6,7-di (ethyl dithio carbonate), 1,1,1-trichloro-3,4-dithiaheptane-6,7-(ethyl dithio carbonate) 1,1-dichloro-3,4-dithiaheptene(-1)-6,7-di (ethyl dithio carbonate), 1,1-trichloro-3,4-dithiaheptane-6,7-di (methyl dithio carbonate), 1,1-dichloro-3,4-dithiaheptene-1,6,7-di (methyl dithio carbonate), 1,1,1-trichloro-3,4-dithiaheptane-6,7-di (butyl dithio carbonate), 1,1-dichloro-3,4-dithiaheptene-1,6,7-di (butyl dithio carbonate), 1,1,1-trichloro-3,4-dithiaheptane-6,7-di(phenyl dithio carbonate), 1,1-dichloro-3,4-dithiaheptene-1,6,7-di (phenyl dithio carbonate), 1,1,2-trichloro-3,4-dithiaheptane 6,7-di (2'-chloro-4'-methylphenyl dithio carbonate), 1,1-dichloro-3,4-dithiaheptene-1,6,7-di (α-naphthyl dithio carbonate).

O-[β-(1,2,2-trichloroethyl dithio) ethyl]-S-[O-ethyl-thiocarboxyl] dithio carbonate, O-[β-(2,2,2-trichloroethyl dithio) ethyl]-S-[O-methyl -thiocarboxyl] dithio carbonate, O-[β-(2,2-dichlorovinyl dithio) ethyl] -S-[O-butyl-thiocarboxyl] dithio carbonate, O-[β-(1,2,2-trichloroethyl dithio) ethyl]-S-[O-phenyl-thiocarboxyl]dithio carbonate, O-[β-(2,2-dichlorovinyl dithio) ethyl]-S-[O-phenyl-thiocarboxyl] dithio carbonate, O-[β-(1,2,2-trichloroethyl dithio)ethyl]-S-[O-p-tolyl-thiocarboxyl] dithio carbonate.

The compounds of formula (3) are made by reacting the appropriate alcohol of formula (1) with the appropriate disulfide chloroformate of formula (5).

Examples of compounds within formula (3) are bis-(1,2,2-trichloroethyl dithioethyl) carbonate, bis-(2,2,2-trichloroethyl dithioethyl) carbonate, bis-(2,2-dichlorovinyl dithioethyl) carbonate, 2-trichloroethyl dithioethyl)-(2,2-dichlorovinyl dithioethyl) carbonate, bis (1,2,2-tribromoethyl dithioethyl) carbonate, bis (1,2,2-trichloroethyl dithioethyl) thiocarbonate, bis (2,2-dichlorovinyl dithioethyl) thiocarbonate.

The compounds of formula (4) are made by one of the following methods:

III (a) reacting the appropriate alcohol of formula (1) with the appropriate alkyl, aryl or haloaryl isocyanate or isothiocyanate;

III (b) by reacting the appropriate alcohol of formula (1) with an appropriate carbamoyl halide, e.g. chloride or bromide;

III (c) by reacting the appropriate polyhaloethyl or polyhalovinyl disulfide chloroformate of formula (5) with the appropriate amount of a primary or secondary amine. 2 equivalents of amine are required for each equivalent of chloroformate.

Examples of suitable isocyanates for reaction III (a) are phenyl isocyanates p-tolyl isocyanate, m-tolyl isocyanate, α-naphthyl isocyanate, 2-chlorophenyl isocyanate, 2,4-dichlorophenyl isocyanate, ethyl isocyanate, propyl isocyanate, butyl isocyanate, hexyl isocyanate, cyclohexyl isocyanate, dodecyl isocyanate, 2-methyl-4-chlorophenyl isocyanate, phenyl isothiocyanate, o-tolyl isothiocyanate, ethyl isothiocyanate, methyl isothiocyanate, butyl isothiocyanate, β-naphthyl isothiocyanate.

Examples of suitable carbamoyl halides for reaction III (b) are dimethyl carbamoyl chloride, diethyl carbamoyl chloride, diethyl carbamoyl bromide, dipropyl carbamoyl chloride dibutyl carbamoyl chloride, dihexyl carbamoyl chloride, dicetyl carbamoyl chloride, diphenyl carbamoyl chloride, di (2-chlorophenyl) carbamoyl chloride, ethyl carbamoyl chloride, amyl carbamoyl chloride, phenyl carbamoyl chloride, di β-naphthyl carbamoyl chloride.

Examples of suitable primary and secondary amines for reaction III (c) are methyl amine, ethyl amine, propyl amine, butyl amine, isopropyl amine, sec. butyl amine, amyl amine, hexyl amine, cyclohexyl amine, cetyl amine, isooctyl amine, dodecyl amine, aniline, o-toluidine, p-toluidine, p-chloroaniline, m-chloroaniline, α-naphthyl amine, β-naphthyl amine, α-methyl-β-naphthyl amine, 2-methyl-4-chloroaniline, piperidine, morpholine, 2-methyl piperidine, pyrrolidine, dimethyl amine, diethyl amine, allyl amine, dipropyl amine, di (isopropyl) amine, dibutyl amine, dihexyl amine di cyclohexyl amine, dioctyl amine, di lauryl amine ethyl propyl amine, N-methyl aniline, N-ethyl aniline, N-butyl aniline, diphenyl amine, o-chloro-N-methyl aniline, 2,4,6-trichloroaniline, 2,4,6-tribromo aniline.

Examples of carbamates and thiocarbamates within formula (4) are 1,2,2-trichloroethyl dithioethyl N-methyl carbamate, 2,2,2-trichloroethyl dithioethyl-N-methyl carbamate, 1,2,2,2-tetrachloroethyl dithioethyl N-methyl carbamate, 1,2-dichloroethyl dithioethyl N-methyl carbamate, 1,2,2-tribromoethyl dithioethyl-N-methyl carbamate, 2,2-dichlorovinyl dithioethyl-N-methyl carbamate, 1,2-dichlorovinyl dithioethyl-N-methyl carbamate, 2,2-dibromovinyl dithioethyl-N-methyl carbamate, 1,2,2-trichloroethyl dithioethyl-N-ethyl carbamate, 2,2,2-trichloroethyl dithioethyl-N-ethyl carbamate, 2,2-dichlorovinyl dithioethyl-N-ethyl carbamate, 1,2,2-trichloroethyl dithioethyl-N-propyl carbamate, 2,2,2-trichloroethyl dithioethyl-N-propyl carbamate, 2,2-dichlorovinyl dithioethyl N-propyl carbamate, 2,2,2-trichloroethyl dithioethyl-N-isopropyl carbamate, 1,2,2-trichloroethyl dithioethyl-N-ethyl carbamate, 2,2,2-trichloroethyl dithioethyl-N-ethyl carbamate, 2,2-dichlorovinyl dithioethyl-N-ethyl carbamate, 1,2,2-trichloroethyl dithioethyl-N-propyl carbamate, 2,2,- dichlorovinyl dithioethyl N-propyl carbamate, 2,2,2-trichloroethyl dithioethyl-N-isopropyl carbamate, 1,2,2-trichloroethyl dithioethyl-N-butyl carbamate, 2,2,2-trichloroethyl dithioethyl-N-butyl carbamate, 2,2-dichlorovinyl dithioethyl-N-butyl carbamate, 2,2-dichlorovinyl dithioethyl-N-sec butyl carbamate, 1,2,2-tichloroethyl dithioethyl-N-amyl carbamate, 2,2-dichlorovinyl dithioethyl-N-amyl carbamate, 2,2,2-trichloroethyl-dithioethyl-N-hexyl carbamate, 2,2-dichlorovinyl dithioethyl-N-hexyl carbamate, 1,2,2-trichloroethyl dithioethyl-N-cyclohexyl carbamate, 2,2-dichlorovinyl dithioethyl-N-cyclohexyl carbamate, 2,2,2-trichloroethyl dithioethyl-N-cetyl carbamate, 2,2-dichlorovinyl dithioethyl-N-isooctyl carbamate, 1,2,2-trichloroethyl dithioethyl-N-dodecyl carbamate, 2,2-dichlorovinyl dithioethyl-N-dodecyl carbamate, 1,2,2-trichloroethyl dithioethyl-N-2'-chloroethyl carbamate, 1,2,2-trichloroethyl dithioethyl-N-phenyl carbamate, 2,2,2-trichloroethyl dithioethyl-N-phenyl carbamate, 2,2-dichlorovinyl dithioethyl-N-phenyl carbamate, 1,2,2-trichloroethyl dithioethyl-N-p-tolyl carbamate, 2,2,2-trichloroethyl dithioethyl-N-m-tolyl carbamate, 2,2-dichlorovinyl dithioethyl-N-o-tolyl carbamate, 1,2,2-trichloroethyl dithioethyl-N-p-ethyl-phenyl carbamate, 2,2-dichlorovinyl dithioethyl-N-p-butylphenyl carbamate, 2,2,2-trichloroethyl dithioethyl-N-p-chlorophenyl carbamate, 1,2,2-trichloroethyl dithioethyl-N, 2',4',6'-trichlorophenyl carbamate, 2,2-dichlorovinyl dithioethyl-N-2',4',6'-tribromophenyl carbamate, 2,2,2-trichloroethyl dithioethyl-N-2',-methyl-4'-chlorophenyl carbamate, 1,2,2-trichloroethyl dithioethyl-N-α-naphthyl carbamate, 2,2,2-trichloroethyl dithioethyl-N-β-naphthyl carbamate, 2,2-dichlorovinyl dithioethyl-N-α-naphthyl carbamate, 1,2,2-trichloroethyl dithioethyl-N-α-methyl-β-naphthyl carbamate, 1,2,2-trichloroethyl dithioethyl-morpholino carbamate, 2,2-dichlorovinyl dithioethyl-morpholino carbamate, 2,2,2-trichloroethyl dithioethyl-piperidyl carbamate, 2,2-dichlorovinyl dithioethyl piperidyl carbamate, 1,2,2-trichloroethyl dithioethyl pyrrolidyl carbamate, 2,2-dichlorovinyl dithioethyl pyrrolidyl carbamate, 1,2,2-trichloroethyl dithioethyl-N, N-dimethyl carbamate, 2,2,2-trichloroethyl dithioethyl-N, N-dimethyl carbamate, 2,2-dichlorovinyl dithioethyl-N, N-dimethyl carbamate, 1,2,2-trichloroethyl dithioethyl-N, N-diethyl carbamate, 2,2,2-trichloroethyl dithioethyl-N, N-diethyl carbamate, 2,2-dichlorovinyl dithioethyl-N, N-diethyl carbamate, 2,2-dibromovinyl dithioethyl-N, N-diethyl carbamate, 1,2-dichlorovinyl dithioethyl-N, N-diethyl carbamate, 1,2,2,2-tetrachloroethyl dithioethyl-N, N-diethyl carbamate, 1,2-dichloroethyl dithioethyl-N, N-diethyl carbamate, 1,2,2-trichloroethyl dithioethyl-N-ethyl-N-propyl carbamate, 2,2-dichlorovinyl dithioethyl-N-ethyl-N-butyl carbamate, 1,2,2-trichloroethyl dithioethyl-N, N-dipropyl carbamate, 2,2,2-trichloroethyl dithioethyl-N, N-dipropyl carbamate, 2,2-dichlorovinyl dithioethyl-N, N-dipropyl carbamate, 1,2,2-trichloroethyl dithioethyl-N, N-diisopropyl carbamate, 2,2-dichlorovinyl dithioethyl-N, N-diisopropyl carbamate, 1,2,2-trichloroethyl dithioethyl-N, N-dibutyl carbamate, 2,2,2-trichloroethyl dithioethyl-N, N-dibutyl carbamate, 2,2-dichlorovinyl dithioethyl-N, N-dibutyl carbamate, 2,2,2-trichloroethyl dithioethyl-N, N-di sec. amyl carbamate, 2,2-dichlorovinyl dithioethyl-N, N-diamyl carbamate, 1,2,2-trichloroethyl dithioethyl-N, N-dihexyl carbamate, 2,2-dichlorovinyl dithioethyl-N, N-dihexyl carbamate, 2,2,2-trichloroethyl dithioethyl-N, N-dicyclohexyl carbamate, 2,2-dichlorovinyl dithioethyl-N, N-dicyclohexyl carbamate, 1,2,2-trichloroethyl dithioethyl-N, N-diheptyl carbamate, 2,2-dichlorovinyl dithioethyl-N, N-diocytyl carbamate, 2,2,2-trichloroethyl dithioethyl-N, N-dilauryl carbamate, 2,2-dichlorovinyl dithioethyl-N, N-dilauryl carbamate, 1,2,2-trichloroethyl dithioethyl-N, N-di-3'-chloropropyl carbamate, 1,2,2-trichloroethyl dithioethyl-N phenyl N-methyl carbamate, 2,2,2-trichloroethyl dithioethyl-N phenyl N-ethyl carbamate, 1,2,2-trichloroethyl dithioethyl-N, N-diphenyl carbamate, 2,2-dichlorovinyl dithioethyl-N, N-diphenyl carbamate, 2,2-dichlorovinyl dithioethyl-N phenyl N-methyl carbamate, 1,2,2-trichloroethyl dithioethyl-N-m-tolyl N-methyl carbamate, 2,2,2-trichloroethyl dithioethyl-N-o-tolyl N-ethyl carbamate, 2,2-dichlorovinyl dithioethyl-N-p-tolyl N-methyl carbamate, 1,2,2-trichloroethyl dithioethyl-N-p-butylphenyl N-methyl carbamate, 2,2-dichlorobinyl dithioethyl-N-t-butylphenyl N-methyl carbamate, 1,2,2-trichloroethyl ditiioethyl-N -o-chlorophenyl N-butyl carbamate, 2,2-dichlorovinyl dithioethyl-N 2',4',6'-trichlorophenyl N-methyl carbamate, 1,2,2-trichloroethyl dithioethyl-N-β-naphthyl N-methyl carbamate, 2,2-dichlorovinyl dithioethyl-N-α-naphthyl N-methyl carbamate, 1,1,1-trichloro-3,4-dithiaheptane-6,7-di (N-methyl carbamate), 1,1,1-trichloro-3,4-dithiaheptane6,7-di (N,N-dimethyl carbamate), 1,1,1-trichloro 3,4-dithiaheptane-6,7-di (N-ethyl carbamate), 1,1,1-trichloro-3,4-dithiaheptane-6,7-di (N,N-diethyl carbamate), 1,1,1-trichloro-3,4-dithiaheptane-6,7-di (N, N-diethyl carbamate), 1,1,2-trichloro-3,4- dithiaheptane-6,7-di(N-ethyl carbamate), 1,1-dichloro-3,4-dithiaheptene(-1)6,7-di (N-methyl carbamate), 1,1-dichloro-3,4-dithiaheptene(-1), 6,7-di (N,N-dimethyl carbamate), 1,1-dichloro-3,4-dithiaheptene(-1), 6,7-di (N-ethyl carbamate), 1,1-dichloro-3,4-dithiaheptene-1,6,7-di (N,N-diethyl carbamate), 1,1,2-trichloro-3,4-dithiaheptane-6,7-di (N-propyl carbamate), 1,1-dichloro-3,4-dithiaheptane(-1)6,7-di (N, N-dipropyl carbamate), 1,1,1-trichloro-3,4-dithiaheptane-6,7-di (N-butyl carbamate), 1,1,2-trichloro-3,4-dithiaheptane-6,7-di (N, N-dibutyl carbamate), 1,1-dichloro-3, 4-dithiaheptene-1,6,7-di (N-butyl carbamate), 1,1-dichloro-3,4-dithiaheptene-1,6,7,-di (N,N-dibutyl carbamate), 1,1,1-trichloro-3,4-dithiaheptane-6,7-di (N-phenyl carbamate), 1,1,2-trichloro-3,4-dithiaheptane-6,7-di-(N, N-diphenyl carbamate), 1,1-dichloro-3,4-dithiaheptene-1,6,7-di (N-phenyl carbamate), 1,1-dichloro3,4-dithiaheptene-1,6,7-di (N,N-diphenyl carbamate), 1,1,1-trichloro-3,4-dithiaheptane-6,7-di(N-β-naphthyl carbamate), 1,1-dichloro-3,4-dithiaheptane(-1), 6,7-di(N, N-diα-naphthyl carbamate), 1,1,2-trichloro-3,4-dithiaheptane-6,7-di (N, N-di-p-chlorophenyl carbamate), 1,1-dichloro-3,4-dithiaheptene(-1)6,7-di(N-o-chlorophenyl carbamate), 1,2,2-trichloroethyl dithioethyl N-methyl thiocarbamate, 2,2-dichlorovinyl dithioethyl-N-methyl thiocarbamate, 2,2,2-trichloroethyl dithioethyl-N-ethyl thiocarbamate, 1,2,2-trichloroethyl dithioethyl-N, N-diethyl thiocarbamate, 2,2-dichlorovinyl dithioethyl-N-ethyl carbamate, 2,2-dichlorovinyl dithioethyl-N, N-diethyl thiocarbamate, 1,2,2-trichloroethyl dithioethyl-N, N-diisopropyl thiocarbamate, 2,2,2-trichloroethyl dithioethyl-N-butyl thiocarbamate, 1,2,2,-trichloroethyl dithioethyl-N, N-dibutyl thiocarbamate, 2,2-dichlorovinyl dithioethyl-N-butyl thiocarbamate, 2,2-dichlorovinyl dithioethyl-N, N-dibutyl thiocarbamate, 1,2,2-trichloroethyl dithioethyl-N-phenyl thiocarbamate, 2,2,2-trichloroethyl dithioethyl-N, N-diphenyl thiocarbamate, 2,2-dichlorovinyl dithioethyl-N-phenyl thiocarbamate, 2,2-dichlorovinyl dithioethyl-N, N-diphenyl thiocarbamate, 1,2,2,-trichloroethyl dithioethyl N-p-tolyl thiocarbamate, 2,2,2-trichloroethyl-dithioethyl N,N-di-p-tolyl thiocarbamate, 2,2-dichlorovinyl dithioethyl-N, N-di-p-tolyl thiocarbamate, 1,1,2-trichloro-3,4-dithiaheptane-6,7-di (n-methyl thiocarbamate), 1,1,1-trichloro-3,4-dithiaheptane-6,7-di (N, N-dibutyl thiocarbamate), 1,1-dichloro3,4-dithiaheptene(-1)6,7-di (ethyl thiocarbamate), 1,1,1-trichloro-3,4-dithiaheptane-6,7-di (N-phenyl thiocarbamate), 1,1-dichloro-3,4-dithiaheptene(-1),6,7-di (N, N-diphenyl thiocarbamate), 1,1-dichloro-3,4-dithiaheptene(-1 ),6,7-di (N-p-tolyl thiocarbamate).

The compounds of formula (5) are made by reacting the appropriate alcohol of formula (1) with phosgene or thiophosgene.

Examples of compounds within formula (5) are: 1,2,2-trichloroethyl dithioethyl chloroformate, 2,2,2-trichloroethyl dithioethyl chloroformate, 2,2-dichlorovinyl dithioethyl chloroformate, 2,2,2-tribromoethyl dithioethyl chloroformate, 2,2-dibromovinyl dithioethyl chloroformate, 1,2-dichlorovinyl dithioethyl chloroformate, 1,2-dichloroethyl dithioethyl chloroformate, 1,2,2,2-tetrachloroethyl dithioethyl chloroformate, 1,2,2-trichloroethyl dithiopropyl-2',3', -di(chloroformate), 2,2,2-trichloroethyl dithiopropyl-2',3'-di (chloroformate), 2,2-dichlorovinyl dithiopropyl-2',3'-di (chloroformate), 1,2,2,-trichloroethyl dithioethyl-thiono chloroformate, 2,2,2-trichloroethyl dithioethyl-thiono chloroformate, 2,2-dichlorovinyl dithioethyl-thiono chloroformate, 1,2,2-trichloroethyl dithiopropyl-2',3'di (thiono chloroformate), 2,2,2-trichloroethyl dithiopropyl-2',3'-di (thiono chloroformate), 2,2-dichlorovinyl dithiopropyl-2',3'-di (thiono chloroformate).

The compounds of formula (6) are prepared by reacting a dicarboxylic acid chloride or bromide with the appropriate monohydric alcohol within formula (1). If two moles of the alcohol are employed per mole of the dicarboxylic acid halide then a bis ester is formed; with equimolar amounts of alcohol and dicarboxylic acid halide there is formed a half ester. The acid halide group in the latter case is then hydrolyzed to free acid with aqueous acid, e.g. hydrochloric acid or with a base such as sodium hydroxide or potassium hydroxide. If excess base is employed there is obtained the half salt, e.g. the sodium mono salt or potassium mono salt.

Examples of suitable dicarboxylic acid halides are oxalyl chloride, oxalyl bromide, malonyl chloride, succinyl chloride, phthalyl chloride, tetrachlorophthalyl chloride, 4-chlorophthalyl chloride, fumaryl chloride, maleyl chloride, terephthalyl chloride, isophthalyl chloride.

Examples of compounds within formula (6) are bis-(2,2,2-trichloroethyl dithioethyl) oxalate, bis-(2,2-dichlorovinyl dithioethyl) oxalate, bis-(1,2,2,2-tetrachloroethyl dithioethyl) oxalate, bis-(1,2-dichloroethyl dithioethyl) oxalate, bis-(1,2,2-tribromoethyl dithioethyl) oxalate, bis-(1,2-dibromovinyl dithioethyl) oxalate, bis-(1,2,2-trichloroethyl dithioethyl) malonate, bis-(2,2,2-trichloroethyl dithioethyl) malonate, bis-(2,2-dichlorovinyl dithioethyl) malonate, bis-(1,2,2-trichloroethyl dithioethyl) succinate, bis-(2,2,2-trichloroethyl dithioethyl) succinate, bis-(2,2-dichlorovinyl dithioethyl) succinate, bis-(1,2,2-trichloroethyl dithioethyl) malonate, bis-(2,2,2-trichloroethyl dithioethyl) maleate, bis-(2,2-dichlorovinyl dithioethyl) malonate, bis-(1,2,2-trichloroethyl dithioethyl) fumarate, bis-(2,2,2-trichloroethyl dithioethyl) fumarate, bis-(2,2-dichlorovinyl dithioethyl) fumarate, bis-(1,2,2-trichloroethyl dithioethyl) phthalate, bis-(2,2,2-trichloroethyl dithioethyl) phthalate, bis-(1,2,2-trichloroethyl dithioethyl) terephthalate, bis-(2,2,2-trichloroethyldithioethyl) terephthalate, bis-(2,2-dichlorovinyl dithioethyl) terephthalate, bis-(1,2,2-trichloroethyl dithioethyl) isophthalate, bis-(2,2-dichlorovinyl dithioethyl) isophthalate, bis-(2,2,2-trichloroethyl dithioethyl) tetrachlorophthalate, bis-(2,2-dichlorovinyl dithioethyl) tetrachlorophthalate, bis-(1,2,2-trichloroethyl dithioethyl) 4-chlorophthalate, mono-1,2,2-trichloroethyl dithioethyl oxalate, mono-2,2-dichloroethyl dithioethyl oxalate) mono-2,2,2-trichloroethyl dithioethyl phthalate.

Unless otherwise indicated all parts and percentages are by weight.

METHODS OF PREPARATION

I. Alcohols

A. The saturated halo-disulfide alcohols of formula (1) are prepared generally by the dropwise addition of the chosen saturated sulfenyl halide in equimolar amounts to the appropriate mercapto-alcohol in an inert solvent. Such solvents include halohydrocarbons such as chloroform, carbon tetrachloride, and tetrachloroethane and hydrocarbons such as benzene, toluene, xylene, hexane, cyclohexane, petroleum ether, and aromatic naphtha. The reaction temperature in the examples below was 25°–30° C. which temperature was maintained by cooling with an ice-water bath completion of the reaction was determined by a negative reaction to XY-starch test paper. Isolation was accomplished by washing the reaction mixture with water drying and vacuum stripping.

B. The unsaturated halo disulfide alcohols within formula (1) were prepared by dehydrohalogenation of the saturated halo-disulfide alcohols with equivalent amounts of sodium ethoxide. In place of sodium ethoxide there can be used potassium ethoxide and other alcoholates having up to three carbon atoms, e.g. sodium methylate, sodium propylate, sodium isopropylate, potassium propylate. The reaction temperature was maintained at 25°–30° C. through cooling with an ice-water bath. Dilution with water furnished the products as bottom oils.

II. Carbonates, Thiol Carbonates, Dithiocarbonates

The poly halo disulfide carbonates, thiol carbonates and dithiocarbonates within formulae (2) and (3) were prepared by three routes:

A. By the reaction of the polyhalo disulfide alcohol of formula (1) with the chosen chloroformate, e.g. alkyl or aryl chloroformate. The alcohol and chosen chloroformate were mixed together and heated at a temperature between 85° and 120° C. (This temperature range can be varied if desired.) Reaction times normally were in the order of several hours and the reaction was completed on the disappearance of the hydroxyl absorption in the infrared spectrum analysis.

B. By the reaction of a polyhalo disulfide chloroformate of formula (5) and a chosen alcohol (e.g. alkyl or aryl alcohol) or mercaptan under the same general condition as described in II(A). in this reaction it was also observed that there was a shift to a lower frequency by the O O in the infrared spectrum of the formed carbonate. In some instances a tertiary base was used to force the reaction. Such tertiary bases include trialkyl amines such as trimethyl amine, triethyl amine, tripropyl amine, and triamyl amine, pyridine, dimethyl aniline, diethyl aniline (and other tertiary aromatic amines) quinoline, α-picoline, β-picoline, lutidine.

C. By the reaction of a chosen polyhalo sulfenyl chloride with an appropriate mercapto carbonate under the same conditions as described in I(A).

III. Carbamates

The polyhalo disulfide carbamates of formula (4) were prepared by three routes:

A. By reaction of the chosen polyhalo disulfide alcohol of formula (1) with an appropriate organic isocyanate (or isothiocyanate), e.g. an alkyl or aryl isocyanate. The reagents are mixed and heated to 95° to 100° C. (This temperature can be varied somewhat if desired). The progress of the reaction was observed by periodic infrared scans. It was complete upon the disappearance of both the OH and N-C-O absorption.

B. By the reaction of a polyhalo disulfide alcohol with an appropriate carbamoyl chloride. The two reactants were mixed and warmed at 80° to 100° C. until the reaction was complete.

C. By the reaction of a polyhalo disulfide chloroformate of formula (5) with a primary or secondary amine. Two equivalents of the amine were added dropwise at 25°–30°C. to one equivalent of the chloroformate to furnish the product in a quantitative yield.

IV. Esters

The esters of formula (2) (other than carbonates, thiolcarbonates and dithiocarbonates) and formula (6) were formed by reacting the polyhalo disulfide alcohol of formula (1) with an appropriate acyl chloride, e.g. an alkyl chloride or aryl chloride in an inert solvent at 30° to 80° C. Suitable solvents include hydrocarbons and halohydrocarbons such as those set forth in Method I(A). The alcohol and acyl chloride are used in equimolar amounts except that when employing the acyl chlorides of dibasic acids there were used two moles of alcohol per mole of acyl halide to form the diester.

V. The polyhalo disulfide chloroformates of formula (5) were prepared by two routes:

A. by allowing a mixture of the chosen halo disulfide alcohol of formula (1) and either phosgene or thiophosgene to stand at room temperature and atmospheric pressure, in an inert solvent (such as those set forth in Method I(A), for several days until an infrared analysis shows the disappearance of the OH absorption and appearance of the

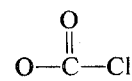

absorption.

(B) By having the same mixture as in V(A) in a sealed tube at 85°–90° C. for several hours. The degree of completeness of the reaction was determined by infrared analysis.

EXAMPLE 1

Compound 5598 - 1,2,2-trichloroethyl-β-hydroxyethyl disulfide 100 grams of 1,2,2-trichloroethyl sulfonyl chloride (0.5 M) reacted at 25°–30° C. with 39 grams of 2-mercaptoethanol in 50 ml. of $CHCl_3$ as described in Method I-A furnished 1,2,2-trichloroethyl-β-hydroxyethyl disulfide in a 92 percent yield as a faintly yellow oil having $n_D^{25}$ 1.5783.

EXAMPLE 2

Compound 5607 - 2,2,2-trichloroethyl-β-hydroxy-ethyl disulfide 100 grams of 2,2,2-trichloroethyl sulfenyl chloride (0.5 M) when reacted at 25°–30° C with 39.5 grams of 2-mercaptoethanol (0.506 M) in 50 ml. of $CHCl_3$ as in example 1 resulted in a 95 percent yield of 2,2,2-trichloroethyl- -hydroxyethyl disulfide as a colorless oil, $n_D^{25}$ 1.5765.

EXAMPLE 3

Compound 5464 - 1,2,2-trichloroethyl-2',3'-dihydroxypropyl disulfide

When 100 grams 1,2,2-trichloroethyl sulfenyl chloride (0.5 M) were reacted at 25°–30° C. with 54 grams monothioglycerol (0.5M) in 50 ml. of $CHCl_3$ by Method I-A, 1,2,2-trichloroethyl-2',3'-dihydroxypropyl disulfide was obtained in an 86 percent yield as an orange colored oil, $n_D^{28}$ 1.5894.

EXAMPLE 4

Compound 6465 - 2,2,2-trichloroethyl-2',3'-dihydroxypropyl disulfide.

The reaction of 185 grams 2,2,2-trichloroethyl sulfenyl chloride (0.925 M) at 20° C. with 100 grams monothioglycerol (0.925 M) in 100 grams of $CHCl_3$ produced 2,2,2-trichloro-2',2'-dihydroxypropyl disulfide in a quantitative yield as a thick colorless oil that solidifies. mp. 46°–47° C.

EXAMPLE 5 Compound 6467 - 2,2-dichlorovinyl-β-hydroxyethyl disulfide

When 48.3 grams 5607 (Ex. 2, 0.2 M) were dehydrochlorinated at 20°–25° C. as described in Method I-B with one equivalent of sodium ethoxide in 150 ml. of ethanol, 2,2-dichlorovinyl-β-hydroxyethyl disulfide was obtained in an 86 percent yield as a reddish oil, $n_D^{25}$ 1.6145.

EXAMPLE 6

Compound 6466 - 2,2-dichlorovinyl-2',3'-dihydroxypropyl disulfide

Reaction at 20°–25° C. of one equivalent sodium ethoxide in 150 grams of ethanol with 54.3 grams 6465 (Ex. 4, 0.2 M) by Method I-B furnished 2,2-dichlorovinyl-2',3'-dihydroxypropyl disulfide in a 90 percent yield as a reddish oil $n_D^{25}$ 1.5930.

EXAMPLE 7

Compound 5420 - 1,2,2-trichloroethyldithioethyl-ethyl carbonate

When 20 grams of 1,2,2-trichloroethyl sulfenyl chloride (0.1 M) were reacted at 30°–35° C. with 15.02 grams ethyl-2-mercaptoethyl-carbonate (0.1M) as described in Method II-C, using 100 ml. of $CHCl_3$ as a solvent 1,2,2-trichloroethyldithioethyl-ethyl carbonate 5420 was obtained in a 97 percent yield as a faintly yellow oil, $b_{0.06}$ 131°–2° C., $n_D^{25}$ 1.5346.

EXAMPLE 8

Compound 5422 - 2,2,2-trichloroethyldithioethylethyl carbonate 20 grams of 2,2,2-trichloroethyl sulfenyl chloride (0.1 M) when reacted at 30°–35° C. with 15.02 grams ethyl-2-mercaptoethyl-carbonate (0.1 M) as in Method II-C using 100 ml. of $CHCl_3$ as a solvent furnished 2,2,2-trichloroethyldithioethyl-ethyl carbonate in a 96 percent yield as a peach colored oil, $n_D^{20}$ 1.5263.

EXAMPLE 9

Compound 6463 - 1,1,2-trichloro-3,4-dithiaheptane-6,7-di(ethyl carbonate)

Reaction of 27.15 grams 5464 (0.1 M, Ex. 3) with 25 grams ethyl chloroformate (0.23 M, 15 percent excess) as described in Method II-A furnished 1,1,2-trichloro-3,4-dithiaheptane-6,7-di(ethyl carbonate) in a 94 percent yield as a yellow oil, $n_D^{25}$ 1.5480.

EXAMPLE 10

Compound 6754 - 1,2,2-trichloroethyldithioethyl-S-ethyl thiol carbonate

When 9.1 grams (0.03 M) 1,2,2-trichloroethyldithioethyl-chloroformate (Ex. 33) were reacted with a large excess of ethyl mercaptan (30 ml. in all) in the presence of 6.1 grams triethylamine at 25° C. as described in Method II-B, 1,2,2-trichloroethyldithioethyl-S-ethyl thiol carbonate was obtained in an 86 percent yield as a reddish oil, $n_D^{23.5}$ 1.5624.

EXAMPLE 11

Compound 6478 - 2,2,2-trichloroethyldithioethyl S-ethyl thiol carbonate

Reaction of 7 grams 2,2,2-trichloroethyldithio-ethyl-chloroformate (Ex. 34) in 25 ml. of $CHCl_3$ (0.023 M) with 2.8 grams ethyl mercaptan (0.046 M, 100 percent excess) and 2.35 grams $Et_3N$ (0.023 M) at 25° C. in Method II-B furnished 2,2,2-trichloroethyldithioethyl-S-ethyl thio carbonate in a 92 percent yield as a dark oil, $n_D^{25}$ 1.5581.

EXAMPLE 12

Compound 6464 - 1,1,2-trichloro-3,4-dithiaheptane-6,7-di(ethylthiol carbonate)

When 27.15 grams of 5464 (0.1 M, Ex. 3) were reacted with 30 grams ethyl chlorothiol formate (0.24 M, 20 percent excess) as described in Method II-A, 1,1,2-trichloro-3,4-dithiaheptane-6,7-di(ethylthiol carbonate) was obtained in an 80 percent yield as a dark yellow oil, $n_D^{25}$ 1.5565.

EXAMPLE 13

Compound 6759 - 1,2,2-trichloroethyldithioethyl-S-ethyl dithiocarbonate

Addition of 2.0 grams of $Et_3N$ (0.02 M) to a mixture of 6.4 grams of 1,2,2-trichloroethyldithioethyl-thiono chloroformate (Ex. 38) (0.02 M) and 1.2 grams of ethyl mercaptan (0.02 M) in 25 ml of 3:1 benzene:pet. ether at 35° C. in Method II-B resulted in 1,2,2-trichloroethyldithioethyl-S-ethyl dithiocarbonate in a quantitative yield as an orange oil, $n_D^{25}$ 1.5840.

EXAMPLE 14

Compound 5606 - 1,2,2-trichloroethyl dithioethyl-phenyl carbonate 24.15 grams of 5598 (0.1 M, Ex. 1) when reacted at 65° C (reflux) in II-A with 15.65 grams phenyl chloroformate (0.1M) in 50 ml. of $CHCl_3$ furnished 1,2,2-trichloroethyldithiosthyl-phenyl carbonate in an 81 percent yield as a yellow oil, $n_D^{25}$ 1.5695.

EXAMPLE 15

Compound 6555 - 2,2,2-trichloroethyldithioethylphenyl carbonate

Reaction of 24.15 grams 5607 (0.1 M, Ex. 2) with 17.65 grams phenyl chloroformate (0.113 M, 9 percent excess) at 114°–120° C. as described in II-A resulted in a quantitative yield of 2,2,2-trichloroethyldithioethylphenyl carbonate as a dark yellow oil, $n_D^{25}$ 1.5632.

EXAMPLE 16

Compound 6554 - 1,2,2-trichloroethyldithioethyl-S-phenyl thiol carbonate

When 24.15 grams of 5598 (0.1 M, Ex. 1) were reacted with 19.25 grams of phenyl chlorothiol formate (0.112 M, 9 percent excess) at 115°–120° C in II-A, 1,2,2,-trichloroethyldithioethyl-S-phenyl thiol carbonate was obtained in a 97 percent yield as a dark oil, $n_D^{25}$ 1.5967.

EXAMPLE 17

Compound 6556 - 2,2,2-trichloroethyldithioethyl-S-phenyl thiol carbonate 24.15 grams of 5607 (0.1 M, Ex. 2) were reacted at 115°–120° C. as in II-A with 19.25 grams of phenyl chlorothiolformate (0.112 M, 9 percent excess), to obtain 2,2,2-trichloroethyldithioethyl-S-phenyl thiol carbonate in a quantitative yield as a dark yellow oil, $n_D^{25}$ 1.5932.

EXAMPLE 18

Compound 6808 - 2,2-dichlorovinyl dithioethylethyl carbonate

Reaction of 5.35 grams of 2,2-dichlorovinyl dithioethyl chloroformate (Ex. 35) (0.02 M) with absolute EtOH (50 ml.) at 80° C as described in Method II-B resulted in 2,2-dichlorovinyldithioethyl-ethyl carbonate in a quantitative yield as a dark oil, $n_D^{25}$ 1.5740.

EXAMPLE 19

Compound 6553 - 2,2-dichlorovinyldithioethyl phenyl carbonate

When 20.5 grams of 6467 (0.1 M, Ex. 5) were reacted with 17.65 grams of phenyl chloroformate (0.113 M, 9 percent excess) at 110°–115° C. in II-A there was obtained 2,2-dichlorovinyldithioethyl phenyl carbonate in a quantitative yield as a dark oil, $n_D^{25}$ 1.5785.

EXAMPLE 20

Compound 6755 - bis-(1,2,2-trichloroethyldithioethyl)-carbonate

When 9.1 grams of 1,2,2-trichloroethyldithioethyl chloroformate (0.03 M) were reacted in 100 ml. of $CHCl_3$ with 7.25 grams of 5598 (0.03 M, Ex. 1) at 30° C. in Method II-A in the presence of 3.1 grams of $Et_3N$ (0.03 M), bis-(1,2,2-trichloroethyldithioethyl)-carbonate was obtained, after removal of $Et_3N$-HCl and heating at 115°–20° C., as a dark oil in a 92 percent yield, $n_D^{23.5}$ 1.5735.

EXAMPLE 21

Compound 6479 - bis-(2,2,2-trichloroethyldithioethyl)-carbonate

When 7 grams of 2,2,2-trichloroethyldithioethyl chloroformate (0.023 M) were reacted with 5.55 grams of 5607 (0.023 M, Ex. 2) at 115-125°C. in II-A, bis-(2,2,2-trichloroethyldithioethyl) carbonate was obtained in a 95 percent yield as a dark oil, $n_D^{25}$ 1.5839.

EXAMPLE 22

Compound 6757 - (1,2,2-trichloroethyldithioethyl)-(2,2-dichlorovinyldithioethyl) carbonate Reaction of 3 grams of 1,2,2-trichloroethyldithioethyl chloroformate (Ex. 33) (0.01 M) with 2 grams of 6467 (0.01 M, Ex. 5) in 50 ml. of benzene in the presence of 1 gram $Et_3N$ (0.01 M) in II-B resulted in a 90 percent yield of (1,2,2-trichloroethyldithioethyl)-(2,2-dichlorovinyldithioethyl) carbonate as a brown oil.

EXAMPLE 23

Compound 6760 -O-[β-(1,2,2-trichloroethyldithio)ethyl]-S-[0-ethyl-thiocarboxyl] dithio carbonate The reaction of 6.4 grams of 1,2,2-trichloroethyldithioethyl thiono chloroformate (0.02 M) with 7.2 grams potassium ethyl xanthate (0.045 M, 125 percent excess) in 100 ml. of tetrahydrofuran containing 3 percent water at 25° C. furnishes, after washing with water, drying and vacuum stripping gave 0-[β-(1,2,2-trichloroethyldithio)ethyl][0-ethyl-thiocarboxyl] dithio carbonate as a dark oil $n_D^{25}$ 1.6111.

EXAMPLE 24

Compound 5604 - 1,2,2-trichloroethyldithioethyl-N, N-diethyl carbamate

When 24.15 grams of 5598 (0.1 M, Ex. 1) were reacted in 50 ml. of $CHCl_3$ with 13.55 grams diethyl carbamoyl chloride (0.1 M) as described in III-B, 1,2,2-trichloroethyldithioethyl-N, N-diethyl carbamate was obtained in an 80 percent yield as a faintly yellow oil, $n_D^{25}$ 1.5413.

EXAMPLE 25

Compound 6810 - 2,2-dichlorovinyldithioethyl-N, N-diethyl carbamate

Reaction of 5.35 grams of 2,2dichlorovinyldithioethyl chloroformate (0.02 M) in 50 ml. of benzene with 2.92 grams of diethyl amine (0.04 M) at 25°–30° C. in III-C resulted in 2,2-dichlorovinyldithioethyl-N, N-diethyl carbamate in a quantitative yield as a dark oil.

EXAMPLE 26

Compound 6451 - 1,2,2-trichloroethyldithioethyl-N-phenyl carbamate 24.15 grams of 5598 (0.1 M, Ex. 1) when reacted with 12 grams of phenyl isocyanate (0.1 M) at 90°–95° C. as described in III-A furnished 1,2,2-trichloroethyldithioethyl-N-phenyl carbamate in an 89 percent yield as a thick oil.

EXAMPLE 27

Compound 6452 - 2,2,2-trichloroethyldithioethyl-N-phenyl carbamate

When 24.15 grams of 5607 (0.1 M, Ex. 2) were reacted with 12 grams of phenyl isocyanate (0.1 M) at 90°–95 C. as in III-A 2,2,2-trichloroethyldithioethyl-N-phenyl carbamate was obtained in a 70 percent yield as a heavy oil.

EXAMPLE 28

Compound 6795 - 1,2,2-trichloroethyldithioethyl acetate

Reaction of 24.15 grams of 5598 (0.1 M, Ex. 1) with 7.85 grams of acetyl chloride (0.1M) in 50 ml. of benzene at 80°–85° C. as described in IV resulted in 1,2,2-trichloroethyldithioethyl acetate in a 97 percent yield as a faintly yellow oil, $n_D^{25}$ 1.5460.

EXAMPLE 29

Compound 6796 - 2,2,2-trichloroethyldithioethyl acetate

When 24.15 grams of 5607 (0.1 M, Ex. 2) were reacted with 7.85 grams of acetyl chloride (0.1 M) in 50 ml. of benzene at 80°–85° C. in Method IV, 2,2,2-trichloroethyldithioethyl acetate was obtained in a 95 percent yield as a faintly yellow oil, $n_D^{25}$ 1.5440.

EXAMPLE 30

Compound 6797 - 2,2-dichlorovinyldithioethyl acetate 6.15 grams of 6467 (0.03 M, Ex. 5) when reacted with 2.36 grams of acetyl chloride (0.03 M) in 25 ml. of benzene at 80°–85° C. in IV, furnished 2,2-dichlorovinyldithioethyl acetate in a 95 percent yield as a dark oil, $n_D^{25}$ 1.5808.

EXAMPLE 31

Compound 6758 - 1,2,2-trichloroethyl-2,3-diacetoxypropyl disulfide

Reaction of 27.15 grams of 5464 (0.1 M, Ex. 3) with 17.7 grams of acetyl chloride (0.226 M, 12 percent excess) in 100 ml. of benzene at 40° C. as described in IV resulted in 1,2,2-trichloroethyl-2, 3-diacetoxypropyl disulfide in a 90 percent yield as a faintly yellow oil, $n_D^{25}$ 1.5280.

EXAMPLE 32

Compound 6761 - bis-(2,2,2-trichloroethyldithioethyl)oxalate

When 24.15 grams of 5607 (0.1M, Ex. 2) were reacted with 6.35 grams of oxalyl chloride (0.05 M) in 100 ml. of benzene at 35° C. as in IV, bis (2,2,2-trichloroethyldithioethyl) oxalate was obtained in a 98 percent yield as a thick yellowish oil.

EXAMPLE 33

1,2,2-trichloroethyldithioethyl chloroformate

Allowing a mixture of 24.2 grams of 5598 (0.1 M, Ex. 1) and 12 grams of phosgene (0.121M, 20 percent excess) to stand at room temperature in 125 ml. dry benzene for three days, resulted in 1,2,2-trichloroethyldithioethyl chloroformate as a light yellow oil in a 92 percent yield, $n_D^{27}$ 1.5530.

EXAMPLE 34

2,2,2-trichloroethyldithioethyl chloroformate

Mixing 12.08 grams of 5607 (0.05 M, Ex. 2) with 7.5 grams of phosgene (0.0757 M, 50 percent excess) in 125 ml. of benzene under the same conditions as in Ex. 33 resulted in 2,2,2-trichloroethyldithioethyl chloroformate in a 96 percent yield as a light yellow oil.

EXAMPLE 35

2,2-dichlorovinyldithioethyl chloroformate

Heating a mixture of 15 grams of 6467 (0.073 M, Ex. 5) and 10 grams of phosgene (0.101 M, 70 percent excess) in 100 ml. dry benzene in a sealed tube at 80°–85° C. and allowing to stand at room temperature overnight furnished 2,2-dichlorovinyldithioethyl chloroformate in a 95 percent yield as reddish oil, $n_D^{24}$ 1.5915.

EXAMPLE 36

1,2,2-trichloroethyldithiopropyl-2',3'-di-(chloroformate)

A mixture of 27.2 grams of 5464 (0.1 M, Ex. 3) and 24 grams of phosgene (0.242 M, 20 percent excess) in 100 ml. benzene was allowed to stand at room temperature for 3 days. At the end of this period the mixture was vacuum stripped and a portion (10 grams) of the residue mixed with 10 grams of phosgene (0.11 M) in 100 ml. benzene and heated in a sealed tube at 80°–85° C. for 5 hours. This completed the reaction as evidenced by the infrared scan to give 1,2,2-trichloroethyldithiopropyl-2',3'-di-(chloroformate).

EXAMPLE 37

2,2,2-trichloroethyldithiopropyl-2',3'-di-(chloroformate)

Heating a mixture of 27.2 grams of 6465 (0.1 M, Ex. 4) and 24 grams of phosgene (0.242 M, 21 percent excess) in 100 ml. benzene, then removing the benzene and heating at 70° C. and 0.05 mm. Hg. for 1 hour furnished 2,2,2-trichloroethyldithiopropyl-2',3'-di-(chloroformate) in an 80 percent yield as a yellow oil, $n_D^{25}$ 1.5780.

EXAMPLE 38

1,2,2-trichloroethyldithioethyl-thiono chloroformate

The chloroformate was prepared by reacting 24.16 grams 5598 (0.1 M, Ex. 1) with 12 grams of thiophosgene (0.103 M) in the presence of 10.1 grams of Et$_3$N (0.1 M) in 50 ml of benzene-petroleum ether (/:1). Removal of the solvent and heating the residue with an additional 6 grams of thiophosgene (0.05 M) furnished 1,2,2-trichloroethyldithioethyl thiono chloroformate in an 85 percent yield as a red oil.

Example 39

The procedure of Example 14 was repeated, replacing the phenyl chloroformate by 0.1 mole of butyl chloroformate to produce 1,2,2-trichloroethyldithioethyl butyl carbonate.

Example 40

The procedure of Example 8 was repeated, replacing the ethyl-2-mercaptoethyl-carbonate by 0.1 mole of methyl-2-mercaptoethyl carbonate to produce 2,2,2-trichloroethyldithoethyl-methyl carbonate.

EXAMPLE 41

The procedure of Example 28 was repeated, replacing the acetyl chloride by 0.1 mole of benzoyl chloride to produce 1,2,2-trichloroethyldithioethyl benzoate.

EXAMPLE 42

The procedure of Example 30 was repeated, replacing the acetyl chloride by 0.03 mole of p-chlorobenzoyl chloride to produce 2,2-dichlorovinyldithioethyl p-chlorobenzoate.

EXAMPLE 43

The procedure of example 29 was repeated, replacing the acetyl chloride by 0.1 mole of butyryl chloride to produce 2,2,2-trichloroethyldithioethyl butyrate.

EXAMPLE 44

The procedure of example 28 was repeated, replacing the acetyl chloride by 0.1 mole of trichloroacetyl chloride to produce 1,2,2-trichloroethyldithioethyl trichloroacetate.

EXAMPLE 45

The procedure of example 25 was repeated, replacing the diethyl amine with 0.04 mole of dimethyl amine to produce 2,2-dichlorovinyldithioethyl-N,N-dimethyl carbamate.

EXAMPLE 46

The procedure of example 24 was repeated, replacing the diethyl amine with 0.04 mole of dibutyl amine to produce 1,2,2-trichloroethyldithioethyl-N,N-dibutyl carbamate.

EXAMPLE 47

The procedure of Example 25 was repeated, replacing the diethyl amine with 0.04 mole of mono propyl amine to produce 2,2-dichlorovinyldithioethyl-N-propyl carbamate.

EXAMPLE 48

The procedure of Example 26 was repeated, replacing the phenyl isocyanate by 0.1 mole of α-naphthyl isocyanate to produce 1,2,2-trichloroethyldithioethyl-N-α-naphthyl carbamate.

EXAMPLE 49

The procedure of Example 25 was repeated, replacing the diethyl amine by 0.04 mole of N-methyl aniline to produce 2,2-dichlorovinyldithioethyl-N-phenyl-N-methyl carbamate.

EXAMPLE 50

The procedure of Example 25 was repeated, replacing the diethyl amine with 0.04 mole of diphenyl amine to produce 2,2-dichlorovinyldithioethyl-N,N-diphenyl carbamate.

EXAMPLE 51

The procedure of Example 25 was repeated, replacing the chloroformate with 0.01 mole of 1,2,2-trichloroethyldithiopropyl-2',3'-di-(chloroformate) to produce 1,1,2-trichloro-3,4-dithiaheptane-6,7-di-(N,N-diethyl carbamate).

EXAMPLE 52

The procedure of Example 36 was repeated, replacing Compound 5464 with 0.1 mole of Compound 6466 to produce 2,2-dichlorovinyldithiopropyl-2',3'-di-(chloroformate).

EXAMPLE 53

The procedure of Example 25 was repeated, replacing the diethyl amine by 0.04 mole of morpholine to produce 2,2-dichlorovinyldithioethyl morpholino carbamate.

EXAMPLE 54

The procedure of Example 25 was repeated, replacing the chloroformate by 0.02 mole of 2,2,2-trichloroethyldithioethyl chloroformate and the diethyl amine by 0.04 mole of piperidine to produce 2,2,2-trichloroethyldithioethyl-piperidyl carbamate.

EXAMPLE 55

The procedure of Example 32 was repeated, replacing the oxalylchloride by 0.05 mole phthalyl chloride to produce bis-(2,2,2-trichloroethyldithioethyl) phthalate.

EXAMPLE 56

The procedure of Example 32 was repeated, replacing Compound 5607 by 0.1 mole of Compound 6467 and replacing the oxalyl chloride by 0.05 mole of succinyl chloride to produce bis-(2,2-dichlorovinyldithioethyl) succinate.

EXAMPLE 57

The procedure of Example 32 was repeated, replacing the oxalyl chloride by maleyl chloride to produce bis-(2,2,2-trichloroethyldithioethyl) maleate.

EXAMPLE 58

Reaction of 24.15 grams (0.1 mole) of 1,2,2-trichloroethyl-β-hydroxyethyl disulfide (Compound 5598) with 11.3 grams of chloroacetyl chloride (0.1 mole) in 100 ml. of dry benzene at 85° C. gave 1,2,2-trichloroethyl dithioethyl chloroacetate (Compound 7108) in a quantitative yield as a dark yellow oil, $n_D^{23}$ 1.5552.

EXAMPLE 59

Reaction of 12.0 grams (0.1 M) of Compound 5598 with 9.1 grams (0.05 M) of trichloroacetyl chloride in 50 ml. of dry benzene at 50°C. gave a 91 percent yield of 1,2,2-trichloroethyldithioethyl trichloroacetate (Compound 7279) as a dark oil, $n_D^{23}$ 1.5550.

EXAMPLE 60

Reaction of 24.15 grams (0.1 M) of Compound 5598 with 14.06 grams (0.1 M) of benzoyl chloride in 100 ml. of dry benzene at 85° C. furnished 1,2,2-trichloroethyldithioethyl benzoate (Compound 7109) as a dark yellow oil in a yield of 92 percent.

EXAMPLE 61

Reaction of 24.15 grams (0.1 M) of Compound 5598 with 16.7 grams (0.1 M) of cinnamoyl chloride in 100 ml. of dry benzene at 85° C. gave a quantitative yield of 1,2,2-trichloroethyldithioethyl cinnamate (Compound 7110) as an orange-yellow oil.

EXAMPLE 62

Reaction of 12.0 grams (0.05 M) of Compound 5598 with 8.53 grams of phenoxyacetyl chloride in 50 ml. of dry carbon tetrachloride at 80° C. gave a 96 percent yield of 1,2,2-trichloroethyldithioethyl phenoxyacetate (Compound 7280) as a yellow oil.

EXAMPLE 63

12.0 grams (0.05 M) of 1,2,2-trichloroethyl-β-hydroxyethyl disulfide (Compound 5598) were reacted with 10.95 grams (0.05 M) of 2-methyl-4-chlorophenoxyacetyl chloride in 50 ml. of dry carbon tetrachloride at 80° C. to give a 99 percent yield of 1,2,2-trichloroethyldithioethyl-2'-methyl-4'-chlorophenoxyacetate as a yellow oil.

EXAMPLE 64

Reaction of 24.15 grams (0.1 M) of 2,2,2-trichloroethyl-β-hydroxyethyl disulfide (Compound 5607) with 11.3 grams (0.1 M) of chloroacetyl chloride in 100 ml. of dry benzene at 85° C. gave 2,2,2-trichloroethyldithioethyl chloroacetate (Compound 7204) in a quantitative yield as a yellow oil, $n_D^{26}$ 1.5516.

EXAMPLE 65

Reaction of 24.15 grams (0.1 M) of Compound 5607 with 14.06 grams (0.1 M) of benzoyl chloride in 100 ml. of dry benzene at 85° C. gave a 97 percent of 2,2,2-trichloroethyldithioethyl benzoate (Compound 7205) as a dark yellow oil, $n_D^{27}$ 1.5760.

EXAMPLE 66

24.15 grams (0.1 M) of Compound 5607 were reacted with 16.7 grams (0.1 M) of cinnamoyl chloride in 100 ml. of dry benzene at 85° C. to give an 89 percent yield of 2,2,2-trichloroethyldithioethyl cinnamate (Compound 7206) as a yellow oil, $n_D^{27}$ 1.6020.

EXAMPLE 67

Reaction of 14.6 grams (0.0712 M) of 2,2-dichlorovinyl-β-hydroxyethyl disulfide (Compound 6467) with 8.05 grams (0.0712 M) of chloroacetyl chloride in 100 ml. of dry benzene at 85° C. gave a 99 percent yield of 2,2-dichlorovinyldithioethyl chloroacetate (Compound 7201) as a dark oil, $n_D^{25}$ 1.5685.

EXAMPLE 68

Reaction of 13.3 grams (0.065 M) of Compound 6467 with 9.15 grams (0.065 M) of benzoyl chloride in 100 ml. of dry benzene at 85° C. gave an 89 percent yield of 2,2-dichlorovinyldithioethyl benzoate (Compound 7202) as a dark oil, $n_D^{25}$ 1.5915.

EXAMPLE 69

Reaction of 12.25 grams (0.0597 M) of Compound 6467 with 9.95 grams (0.597 M) of cinnamoyl chloride in 100 ml. of dry benzene at 85° C. gave a quantitative yield of 2,2-dichlorovinyldithioethyl cinnamate (Compound 7203) as a dark oil, $n_D^{25}$ 1.6240.

EXAMPLE 70

Reaction of 13.3 grams (0.065 M) of Compound 6467 with 4.72 grams (0.0325 M) of fumaryl chloride in 100 ml. of dry benzene at 85° C. gave a 99% yield of bis (2,2-dichlorovinyldithioethyl) fumarate (Compound 7224) as a thick yellow oil, $n_D^{27}$ 1.5958.

The products of the present invention can be used alone or they can be applied together with inert solids to form dusts, or can be suspended in a suitable liquid diluent, e.g., organic solvents or water.

There can also be added surface active agents or wetting agents and/or inert solids in the liquid formulations. In such case, the active ingredient can be from 0.01 to 95 percent by weight of the entire composition.

As organic solvents there can be employed hydrocarbons, e.g., benzene, toluene, xylene, kerosene, diesel fuel, fuel oil, and petroleum naphtha, ketones such as acetone, methyl ethyl ketone and cyclohexanone, chlorinated hydrocarbons such as carbon tetrachloride, chloroform, trichloroethylene, and perchloroethylene, esters such as ethyl acetate, amyl acetate and butyl acetate, ethers, e.g., ethylene glycol monomethyl ether and diethylene glycol monomethyl ether, alcohols, e.g., methanol, ethanol, isopropanol, amyl alcohol, ethylene glycol, propylene glycol, butyl carbitol acetate and glycerine. Mixtures of water and organic solvents, either as solutions or emulsions, can be employed.

The novel products can also be applied as aerosols, e.g., by dispersing them in air by means of a compressed gas such as dichlorodifluoromethane or trichlorofluoromethane and other Freons and Genetrons, for example.

The products of the present invention can also be applied with adjuvants or carriers such as talc, pyrophyllite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

As stated, it is frequently desirable to incorporate a surface active agent in the compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propyl-naphthalene sulfonic acid, di (2-ethylhexyl) ester of sodium sulfosuccinic acid, sodium lauryl sulfate, sodium decane sulfonate, sodium salt of the sulfonated monoglyceride of coconut fatty acids, sorbitan sesquioleate, lauryl trimethyl ammonium chloride, octadecyl trimethyl ammonium chloride, polyethylene glycol lauryl ether, polyethylene glycol esters of fatty acids and rosin acids, e.g.,Ethofat 7 and 13, sodium N-methyl-N-oleyl taurate, Turkey Red Oil, sodium dibutyl naphthalene sulfonate, sodium lignin sulfonate, polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1,000), polyethylene glycol ester of tall oil acids, sodium octyl phenoxyethoxyethyl sulfate, tris (polyoxyethylene) sorbitan monostearate (Tween 60), and sodium dihexyl sulfosuccinate.

The solid and liquid formulations can be prepared by any of the conventional procedures. For example, the compounds of the present invention can be applied to soil, growing plants, e.g., trees, cotton plants, wheat and other grain plants, vegetable plants, seeds, fabrics, etc., to give pesticidal protection or can be applied to mature cotton beans, tomatoes, or other leafy plants to give defoliation or desiccant action.

The biological testing results are complied in the following tables. In Tables 1, 2, 3, 7 and 8 a 0–10 scale is employed with 0 indicating no inhibition and 10 indicating complete inhibition. In Table 4 and the saprophytic nematode portion of Table 9 the tabulation is expressed as percent non-motility after a 4 day incubation period. The blank no motility rate was 10 percent. In Tables 4, 10 11, 12 and in the desiccation part of Tables 6 and 13, the 0–10 scale described above was employed while the defoliation data in Tables 6 and 13 is given as actual percent defoliation. In the parasitic nematode part of Table 9 the severity of root knots on tomato plants planted in soil infested with Meloidogyne spp. is indicated on a 0–10 scale where 0 indicates severe knotting and 10 indicates freedom from knots.

In the Table the following abbreviations are used:

| | |
|---|---|
| COL | Collectotrichum obiculare |
| FUS | Fusarium oxy. f. lycoperseci |
| F. N. | Fusarium nivale |
| HEL | Helminthosporium sativum |
| RHIZ | Rhizoctonia solani |
| VERT | Verticillium albo-atrum |
| C. ULMI | Ceratocystis ulmi |
| PY | Pythium irregulare |
| Ph | phytotoxic |
| ppm | parts per million |
| No./A | pounds per acre |

In Tables 1 and 7 potato dextrose agar was used in the agar plate tests.

The spore germination tests were carried out as follows. A 1 percent suspension of the compound to be tested in water was prepared and there was also prepared a solution of agar in the water. The suspension was appropriately diluted with water and mixed with the agar solution to give the indicated concentrations of compounds in ppm. 0.3 ml. of the agar material was placed on a microscope slide and a film allowed to form and solidify. Spores of Alternaria or Ustilago were dusted on the slides and they were placed in Petri dishes with filter paper and incubated at room temperature for 24 hours and the non germinated spores registered, 10 indicating 100 percent non germination in Table 2.

The foliage fungicide tests were carried out with COL infested cucumber leaves.

The soil fungicide tests in Table 3 were carried out with an equal weight of the test compound and attapulgus clay. The mixture was blended with soil infested with indicated organism and allowed to stand for 24 hours. Then the blend was spread evenly over a wet paper towel and 50 pea seeds were placed on the soil. The towels were rolled up and put in metal cans and stored at 40° F. for 5 days and then at 75° F. for 4 days. The cans were then removed and the rate of fungus growth recorded, with 10 indicating no growth.

In Table 4 and the saprophytic portion of Table 9 the compounds were tested as nematocides using water as the medium with Panagrellus and Rhabditis spp. at room temperature. The less active compounds require rates above the 400 ppm. maximum used in Table 9.

Many of the compounds also are useful as nematocides against parasitic nematodes such as Meloidogyne spp. as shown in Table 9 as well as against other root knot nematodes. Rates above 200 ppm. are required for the less active compounds.

TABLE 1.—AGAR PLATES

| | | Organism at p.p.m. | | | | | | | | | | | | | | | | | |
|---|---|---|---|---|---|---|---|---|---|---|---|---|---|---|---|---|---|---|---|
| | | Col | | | Fus | | | Hel | | | Rhiz | | | Vert | | | C. ulmi | | |
| Code No. | Ex. No. | 500 | 100 | 10 | 500 | 100 | 10 | 500 | 100 | 10 | 500 | 100 | 10 | 500 | 100 | 10 | 500 | 100 | 10 |
| 5598[1] | 1 | | | | 10 | 5 | 0 | 10 | 10 | 0 | 10 | 5 | 0 | | | | | | |
| 5607 | 2 | 10 | 5 | 0 | 10 | 5 | 0 | 8 | 5 | 0 | 0 | 0 | 0 | 5 | 0 | 0 | 10 | 10 | 5 |
| 5464[1] | 3 | | | | 10 | 8 | 4 | 10 | 10 | 0 | 10 | 5 | 5 | | | | | | |
| 6465 | 4 | 10 | 5 | 0 | 10 | 8 | 0 | 8 | 5 | 0 | 0 | 0 | 0 | 10 | 8 | 0 | | | |
| 6466 | 5 | 10 | 10 | 0 | 10 | 10 | 5 | 10 | 10 | 0 | 10 | 8 | 0 | 10 | 10 | 5 | | | |
| 6467 | 6 | 10 | 10 | 5 | 10 | 10 | 8 | 10 | 10 | 5 | 10 | 8 | 0 | 10 | 10 | 8 | 10 | 10 | 5 |
| 5420[1] | 7 | | | | 10 | 10 | 8 | 10 | 10 | 10 | 10 | 10 | 8 | | | | 10 | 8 | 8 |
| 5422[1] | 8 | | | | 10 | 10 | 5 | 10 | 10 | 5 | 10 | 10 | 8 | | | | | | |
| 6463 | 9 | 10 | 5 | 0 | 10 | 5 | 0 | 8 | 5 | 0 | 0 | 0 | 0 | 10 | 8 | 5 | 10 | 8 | 5 |
| 6754 | 10 | 10 | 10 | 8 | 10 | 10 | 5 | 10 | 8 | 5 | 10 | 10 | 8 | 10 | 10 | 5 | 10 | 8 | 5 |
| 6478 | 11 | 10 | 5 | 0 | 10 | 5 | 0 | 5 | 0 | 0 | 0 | 0 | 0 | 10 | 5 | 0 | | | |
| 6464 | 12 | 10 | 10 | 0 | 10 | 5 | 0 | 0 | 0 | 0 | 0 | 0 | 0 | 8 | 5 | 0 | 10 | 8 | 5 |
| 6759 | 13 | 10 | 10 | 5 | 10 | 10 | 5 | 10 | 10 | 2 | 10 | 10 | 5 | 10 | 10 | 5 | 10 | 10 | 5 |
| 5606[1] | 14 | | | | 10 | 5 | 0 | 10 | 8 | 5 | 10 | 5 | 5 | 10 | 10 | 5 | 10 | 8 | 5 |
| 6555 | 15 | 10 | 0 | 0 | 10 | 0 | 0 | 0 | 0 | 0 | 10 | 5 | 0 | 10 | 10 | 10 | 8 | 5 | 0 |
| 6554 | 16 | 10 | 10 | 0 | 10 | 5 | 0 | 10 | 9 | 0 | 10 | 10 | 8 | 10 | 10 | 8 | 10 | 10 | 5 |
| 6556 | 17 | 10 | 10 | 0 | 10 | 0 | 0 | 10 | 0 | 0 | 8 | 5 | 5 | 10 | 10 | 5 | 10 | 8 | 0 |
| 6808 | 18 | 10 | 10 | 8 | 10 | 10 | 5 | 10 | 10 | 0 | 10 | 5 | 5 | 10 | 10 | 5 | 10 | 10 | 0 |
| 6553 | 19 | 10 | 10 | 0 | 10 | 5 | 0 | 10 | 0 | 0 | 10 | 8 | 5 | 10 | 10 | 8 | 10 | 8 | 0 |
| 6755 | 20 | 10 | 10 | 10 | 10 | 10 | 10 | 10 | 10 | 5 | 10 | 10 | 10 | 10 | 10 | 10 | 10 | 10 | 5 |
| 6479 | 21 | 0 | 0 | 0 | 5 | 0 | 0 | 0 | 0 | 0 | 0 | 0 | 0 | 0 | 0 | 0 | | | |
| 6757 | 22 | 10 | 10 | 10 | 10 | 10 | 10 | 10 | 8 | 5 | 10 | 10 | 8 | 10 | 10 | 10 | 10 | 8 | 5 |
| 6760 | 23 | 10 | 10 | 5 | 10 | 10 | 5 | 8 | 5 | 2 | 10 | 10 | 10 | 10 | 10 | 10 | 10 | 10 | 5 |
| 5605[1] | 24 | | | | 10 | 8 | 5 | 10 | 8 | 8 | 10 | 10 | 10 | | | | 10 | 8 | 5 |
| 6810 | 25 | 10 | 10 | 5 | 10 | 10 | 5 | 8 | 5 | 2 | 8 | 5 | 2 | 10 | 8 | 5 | 8 | 5 | 2 |
| 6451 | 26 | 8 | 5 | 0 | 8 | 5 | 0 | 8 | 5 | 0 | 8 | 0 | 0 | 10 | 5 | 0 | | | |
| 6452 | 27 | 8 | 0 | 0 | 5 | 0 | 0 | 0 | 0 | 0 | 0 | 0 | 0 | 5 | 0 | 0 | | | |
| 6795 | 28 | 10 | 10 | 5 | 10 | 10 | 10 | 10 | 10 | 10 | 10 | 5 | 5 | 10 | 10 | 10 | 10 | 10 | 0 |
| 6796 | 29 | 10 | 10 | 8 | 10 | 10 | 5 | 10 | 10 | 5 | 10 | 10 | 2 | 10 | 10 | 5 | 10 | 10 | 5 |
| 6797 | 30 | 10 | 10 | 10 | 10 | 10 | 10 | 10 | 10 | 8 | 10 | 10 | 5 | 10 | 10 | 10 | 10 | 10 | 5 |
| 6758 | 31 | 10 | 10 | 8 | 10 | 10 | 10 | 10 | 10 | 5 | 10 | 10 | 8 | 10 | 10 | 5 | 10 | 5 | 2 |
| 6761 | 32 | 10 | 8 | 5 | 10 | 10 | 5 | 8 | 5 | 0 | 5 | 0 | 0 | 10 | 8 | 0 | 10 | 8 | 0 |

[1] Higher rate is 1,000 p.p.m.

In Table 2 the spore germination tests were carried out with alternaria spp. and Ustilago and the foliage fungicide tests with Collectotrichum Obiculare.

As shown in Tables 5, 10 and 12 the compounds exhibited some post emergent herbicide activity. While many of the compounds did not exhibit any significant preemergent herbicide activity several of the compounds showed excellent preemergent herbicide activity. 1,2,2-trichloroethyldithioethyl-2'-methyl-4'-chlorophenoxy acetate was an outstanding preemergent herbicide.

The compounds were tested as defoliants and desiccants for cotton as shown in Tables 6 and 13. The compounds were applied as a 2 percent solution in acetone at the indicated rates per acre of cotton plants.

As can be seen from Table 3, many of the compounds were extremely effective soil fungicides even at the lowest test rates. Because of the effectiveness of the compounds in the primary soil fungicide test in Table 8 some of the compounds were subjected to a secondary soil fungicide screening.

In the defoliant-desiccant tests, Compound 6467 did not show defoliation at the low rates employed in Table 6 but surprisingly showed very good desiccation. This can be taken advantage of in Texas and other areas where it is necessary to desiccate cotton prior to picking.

TABLE 2.—SPORE GERMINATION—FOLIAGE FUNGICIDE

| Code No. | Ex. No. | Alternaria | | | Ustilago | | | Colletotrichum obiculare | | | | |
|---|---|---|---|---|---|---|---|---|---|---|---|---|
| | | 1,000 | 100 | 10 | 1,000 | 100 | 10 | 1,000 | 100 | 50 | 10 | 5 |
| 5598 | 1 | 0 | 0 | | 0 | 0 | 0 | | | | | |
| 5607 | 2 | 10 | 10 | 0 | 10 | 8 | 0 | 10 | 10 | 10 | 10 | 10 |
| 5464 | 3 | 10 | 10 | 0 | 10 | 10 | 0 | | | | | |
| 6465 | 4 | 10 | 5 | 0 | 10 | 5 | 0 | 10 | 10 | | 0 | |
| 6466 | 5 | 10 | 0 | 0 | 10 | 0 | 0 | Ph | 10 | | 0 | |
| 6467 | 6 | 10 | 10 | 0 | 10 | 10 | 0 | 0 | 0 | | 0 | |
| 5420 | 7 | 10 | 10 | 8 | | | | Ph | 8 | 10 | 10 | 10 |
| 5422 | 8 | 10 | 8 | 3 | | | | | | | | |
| 6463 | 9 | 10 | 5 | 0 | 10 | 5 | 0 | Ph | 10 | 10 | 10 | 10 |
| 6754 | 10 | 5 | 0 | 0 | 5 | 0 | 0 | | | | | |
| 6478 | 11 | 10 | 5 | 0 | 10 | 0 | 0 | Ph | 5 | | 0 | |
| 6464 | 12 | 10 | 5 | 0 | 10 | 5 | 0 | 10 | 10 | 10 | 10 | 10 |
| 6759 | 13 | 8 | 0 | 0 | 5 | 0 | 0 | | | | | |
| 5606 | 14 | 0 | 0 | 0 | 0 | 0 | 0 | 10 | 10 | 10 | 10 | 10 |
| 6555 | 15 | 5 | 0 | 0 | 5 | 0 | 0 | | | | | |
| 6554 | 16 | 10 | 5 | 0 | 10 | 0 | 0 | | | | | |
| 6556 | 17 | 5 | 0 | 0 | 5 | 0 | 0 | | | | | |
| 6808 | 18 | 0 | 0 | 0 | 0 | 0 | 0 | | | | | |
| 6553 | 19 | 10 | 5 | 0 | 0 | 0 | 0 | | | | | |
| 6755 | 20 | 10 | 8 | 0 | 10 | 5 | 0 | | | | | |
| 6479 | 21 | 0 | 0 | 0 | 10 | 10 | 0 | 0 | 0 | | 0 | |
| 6757 | 22 | 10 | 8 | 0 | 10 | 5 | 0 | | | | | |
| 6760 | 23 | 8 | 0 | 0 | 5 | 0 | 0 | | | | | |
| 5605 | 24 | 10 | 8 | 8 | 10 | 10 | 10 | 10 | 10 | 10 | 10 | 10 |
| 6810 | 25 | 0 | 0 | 0 | 0 | 0 | 0 | | | | | |
| 6451 | 26 | 10 | 0 | 0 | 10 | 0 | 0 | Ph | 0 | | 0 | |
| 6452 | 27 | 5 | 0 | 0 | 0 | 0 | 0 | 10 | 10 | | | |
| 6795 | 28 | 8 | 5 | 0 | 8 | 0 | 0 | | | | | |
| 6796 | 29 | 8 | 5 | 0 | 8 | 0 | 0 | | | | | |
| 6797 | 30 | 5 | 0 | 0 | 5 | 0 | 0 | | | | | |
| 6758 | 31 | 10 | 8 | 0 | 10 | 5 | 0 | | | | | |
| 6761 | 32 | 5 | 0 | 0 | 0 | 0 | 0 | | | | | |

TABLE 3.—SOIL FUNGICIDE

| Code No. | Ex. No. | Py at #/a. | | Fu at p.p.m. | | | Rhiz at p.p.m. | | | Vert. at p.p.m. | | |
|---|---|---|---|---|---|---|---|---|---|---|---|---|
| | | 200 | 50 | 500 | 100 | 10 | 500 | 100 | 10 | 500 | 100 | 10 |
| 5598 | 1 | 9 | 8 | | 10 | 10 | | 10 | 0 | | 10 | 10 |
| 5607 | 2 | 10 | 9 | 10 | 5 | 0 | 10 | 5 | 0 | 10 | 5 | 0 |
| 5464 | 3 | 10 | 9 | | 10 | 5 | | 10 | 5 | | 10 | 0 |
| 6465 | 4 | 10 | 3 | 8 | 8 | 0 | 5 | 0 | 0 | 8 | 5 | 0 |
| 6466 | 5 | 10 | 4 | 10 | 8 | 5 | 10 | 8 | 5 | 10 | 0 | 0 |
| 6467 | 6 | 10 | 8 | 10 | 10 | 8 | 10 | 10 | 10 | 10 | 10 | 10 |
| 5420 | 7 | 9 | 9 | | 10 | 0 | | 10 | 8 | | 10 | 8 |
| 5422 | 8 | 7 | 2 | | 10 | 5 | | 10 | 10 | | 10 | 10 |
| 6463 | 9 | 10 | 6 | 10 | 10 | 10 | 10 | 10 | 10 | 10 | 10 | 10 |
| 6754 | 10 | 3 | 2 | | 10 | 0 | | 10 | 0 | | 10 | 8 |
| 6478 | 11 | 6 | 5 | 10 | 8 | 5 | 10 | 8 | 10 | 5 | 0 |
| 6464 | 12 | 10 | 6 | 10 | 10 | 10 | 10 | 8 | 5 | 10 | 10 | 8 |
| 6759 | 13 | 9 | 6 | | 0 | 0 | | 8 | 0 | 10 | 10 | 8 |
| 5606 | 14 | 10 | 7 | | 10 | 0 | | 10 | 8 | | 10 | 8 |
| 6555 | 15 | 4 | 0 | | 10 | 0 | | 10 | 0 | | 10 | 8 |
| 6554 | 16 | 8 | 5 | | 10 | 0 | | 10 | 8 | | 10 | 8 |
| 6556 | 17 | 0 | 0 | | 10 | 0 | | 8 | 2 | | 10 | 5 |
| 6808 | 18 | 6 | 2 | | 5 | 0 | | 10 | 0 | | 5 | 0 |
| 6553 | 19 | 7 | 0 | | 10 | 0 | | 10 | 5 | | 10 | 5 |
| 6755 | 20 | 9 | 6 | | 10 | 10 | | 10 | 10 | | 10 | 10 |
| 6479 | 21 | 4 | 0 | 0 | 0 | 5 | 2 | 0 | 8 | 5 | 0 |
| 6757 | 22 | 8 | 4 | | 10 | 10 | | 10 | 10 | | 10 | 10 |
| 6760 | 23 | 6 | 2 | | 8 | 0 | | 0 | 0 | | 10 | 10 |
| 5605 | 24 | 10 | 7 | | 10 | 0 | | 10 | 8 | | 10 | 10 |
| 6810 | 25 | 0 | 0 | | 10 | 0 | | 0 | 0 | | 5 | 0 |
| 6451 | 26 | 9 | 3 | 10 | 0 | 0 | 10 | 8 | 5 | 8 | 5 | 0 |
| 6452 | 27 | 6 | 5 | 0 | 0 | 0 | 10 | 5 | 0 | 0 | 0 |
| 6795 | 28 | 10 | 7 | | 10 | 8 | | 10 | 0 | | 10 | 10 |
| 6796 | 29 | 7 | 6 | | 10 | 0 | | 10 | 0 | | 10 | 10 |
| 6797 | 30 | 6 | 4 | | 0 | 0 | | 10 | 0 | | 5 | 0 |
| 6758 | 31 | 6 | 4 | | 10 | 10 | | 10 | 8 | | 10 | 8 |
| 6761 | 32 | 6 | 4 | | 8 | 0 | | 0 | 0 | | 10 | 5 |

TABLE 4.—NEMATOCIDE

| Code No. | Ex. No. | Saprophytic at p.p.m. | | | | | |
|---|---|---|---|---|---|---|---|
| | | 400 | 200 | 100 | 50 | 25 | 12.5 |
| 5598 | 1 | | 100 | 80 | 50 | 30 | 10 |
| 5607 | 2 | 100 | 100 | | | 100 | |
| 5464 | 3 | | 80 | 80 | 50 | 10 | 10 |
| 6465 | 4 | 100 | 50 | | | 30 | |
| 6466 | 5 | 100 | 80 | | | 50 | |
| 6467 | 6 | 100 | 100 | | | 80 | |
| 5420 | 7 | | 100 | 100 | 100 | 100 | 80 |
| 5422 | 8 | | 80 | 40 | 40 | 10 | 10 |
| 6463 | 9 | 100 | 80 | | | 30 | |
| 6754 | 10 | 100 | 100 | | | 100 | |
| 6478 | 11 | 100 | 80 | | | 30 | |
| 6464 | 12 | 100 | 80 | | | 30 | |
| 6759 | 13 | 100 | 100 | | | 100 | |
| 5606 | 14 | | 100 | 100 | 50 | 50 | 10 |
| 6555 | 15 | 10 | 10 | | | 10 | |
| 6554 | 16 | 100 | 50 | | | 10 | |
| 6556 | 17 | 50 | 10 | | | 10 | |
| 6808 | 18 | 100 | 100 | | | 100 | |
| 6553 | 19 | 10 | 10 | | | 10 | |
| 6755 | 20 | 100 | 100 | | | 100 | |
| 6479 | 21 | 80 | 50 | | | 30 | |
| 6757 | 22 | 100 | 100 | | | 100 | |
| 6760 | 23 | 80 | 80 | | | 30 | |
| 5605 | 24 | | 100 | 100 | 100 | 80 | 50 |
| 6810 | 25 | 80 | 80 | | | 10 | |
| 6451 | 26 | 100 | 80 | | | 50 | |
| 6452 | 27 | 100 | 80 | | | 50 | |
| 6795 | 28 | 100 | 100 | | | 100 | |
| 6796 | 29 | 100 | 100 | | | 100 | |
| 6797 | 30 | 100 | 100 | | | 100 | |
| 6758 | 31 | 80 | 50 | | | 50 | |
| 6761 | 32 | 100 | 80 | | | 50 | |

TABLE 5.—POST-EMERGENT HERBICIDE

| Code number | Example number | Plant at #/a | | | | | | | | | |
|---|---|---|---|---|---|---|---|---|---|---|---|
| | | Oats | | Sugar Beets | | Radish | | Flax | | Wheat | |
| | | 8 | 2 | 8 | 2 | 8 | 2 | 8 | 2 | 8 | 2 |
| 5598 | 1 | 9 | 6 | 10 | 7 | 10 | 8 | 10 | 6 | 8 | 6 |
| 5607 | 2 | 3 | 0 | 2 | 0 | 1 | 0 | 3 | 0 | 3 | 0 |
| 5464 | 3 | 8 | 1 | 10 | 7 | 10 | 6 | 9 | 7 | 6 | 0 |
| 6465 | 4 | 4 | 0 | 2 | 2 | 1 | 0 | 0 | 0 | 2 | 1 |
| 6466 | 5 | 6 | 4 | 9 | 7 | 8 | 7 | 9 | 8 | 5 | 3 |
| 6467 | 6 | 4 | 4 | 10 | 7 | 9 | 7 | 10 | 9 | 5 | 4 |
| 5420 | 7 | 10 | 6 | 10 | 4 | 9 | 4 | 9 | 3 | 9 | 4 |
| 5422 | 8 | 9 | 7 | 10 | 4 | 7 | 3 | 6 | 1 | 9 | 5 |
| 6463 | 9 | 3 | 4 | 4 | 5 | 4 | 5 | 3 | 2 | 3 | 3 |
| 6754 | 10 | | / | | 6 | | 6 | | 6 | | / |
| 6478 | 11 | 1 | 0 | 2 | 2 | 0 | 0 | 0 | 1 | 1 | 0 |
| 6464 | 12 | 2 | 1 | 4 | 3 | 6 | 3 | 4 | 3 | 3 | 1 |
| 6759 | 13 | | | | | | | | | | |
| 5606 | 14 | 3 | 3 | 5 | 6 | 6 | 5 | 6 | 3 | 3 | 0 |
| 6555 | 15 | 2 | 2 | 5 | 3 | 5 | 3 | 5 | 3 | 2 | 2 |
| 6554 | 16 | 6 | 2 | 9 | 4 | 6 | 4 | 6 | 3 | 3 | 1 |
| 6556 | 17 | 3 | 1 | 4 | 3 | 4 | 4 | 3 | 3 | 2 | 2 |
| 6808 | 18 | 4 | 2 | 7 | 4 | 6 | 6 | 7 | 5 | 4 | 1 |
| 6553 | 19 | 5 | 2 | 7 | 2 | 6 | 3 | 5 | 3 | 3 | 2 |
| 6755 | 20 | | 6 | | 6 | | 6 | | 5 | | 2 |
| 6479 | 21 | | 0 | | 0 | | 0 | | 0 | | 0 |
| 6757 | 22 | | 0 | | 2 | | 4 | | 4 | | 1 |
| 6760 | 23 | | 0 | | 3 | | 4 | | 4 | | 1 |
| 5605 | 24 | 4 | 2 | 8 | 8 | 7 | 2 | 6 | 4 | 3 | 3 |
| 6810 | 25 | | 3 | | 4 | | 4 | | 3 | | 1 |
| 6451 | 26 | 1 | 0 | 4 | 3 | 4 | 5 | 2 | 0 | 1 | 0 |
| 6452 | 27 | 0 | 0 | 3 | 2 | 0 | 0 | 0 | 0 | 0 | 0 |
| 6795 | 28 | 6 | 3 | 10 | 6 | 10 | 5 | 6 | 5 | 5 | 1 |
| 6796 | 29 | 6 | 1 | 4 | 1 | 4 | 1 | 4 | 1 | 3 | 1 |
| 6797 | 30 | 6 | 3 | 10 | 6 | 8 | 6 | 10 | 6 | 6 | 3 |
| 6758 | 31 | 6 | 1 | 5 | 5 | 6 | 6 | 8 | 6 | 4 | 1 |
| 6761 | 32 | | 0 | | 0 | | 2 | | 1 | | 0 |

TABLE 6.—DEFOLIANT-DESICCANT

| Code No. | Ex. No. | At #/a. | | | |
|---|---|---|---|---|---|
| | | Defoliation | | Desiccation | |
| | | 8 | 2 | 8 | 2 |
| 5598 | 1 | 21.4 | 62.5 | 4 | |
| 5607 | 2 | | | | 1 |
| 5464 | 3 | 85 | 0 | | |
| 6465 | 4 | 0 | 0 | 3 | 2 |
| 6466 | 5 | 0 | 0 | | 3 |
| 6467 | 6 | 0 | 0 | 9 | 9 |
| 5420 | 7 | | 71.4 | 0 | |
| 5422 | 8 | 22.7 | 15 | 2 | |
| 6463 | 9 | 0 | 0 | 4 | 1 |
| 6754 | 10 | | | | |
| 6478 | 11 | 0 | 0 | | 5 |
| 6464 | 12 | 0 | 0 | | 2 |
| 6759 | 13 | | | | |
| 5606 | 14 | 85.4 | 25.0 | 0 | 0 |
| 6555 | 15 | 0 | 0 | 1 | 1 |
| 6554 | 16 | 0 | 0 | 1 | 1 |
| 6556 | 17 | | | | 3 |
| 6808 | 18 | | | | |
| 6553 | 19 | | | 2 | 1 |
| 6755 | 20 | | | | |
| 6479 | 21 | | | | |
| 6757 | 22 | | | | |
| 6760 | 23 | | | | |
| 5605 | 24 | 40 | 25.9 | 6 | |
| 6810 | 25 | | | | |
| 6451 | 26 | 16 | 0 | 3 | 1 |
| 6452 | 27 | 0 | 0 | 1 | 0 |
| 6795 | 28 | | | | |
| 6796 | 29 | | | | |
| 6797 | 30 | | | | |
| 6758 | 31 | | | | |
| 6761 | 32 | | | | |

TABLE 7.—AGAR PLATES

| Code No. | Ex. | C. ulmi 500 | 100 | 10 | Col 500 | 100 | 10 | Fus 500 | 100 | 10 | F.N. 500 | 100 | 10 | Hel 500 | 100 | 10 | Rhiz 500 | 100 | 10 | Vert 500 | 100 | 10 |
|---|---|---|---|---|---|---|---|---|---|---|---|---|---|---|---|---|---|---|---|---|---|---|
| 7108 | 58 | 8 | 8 | 5 | 10 | 10 | 5 | 10 | 10 | 0 | 10 | 8 | 5 | 10 | 10 | 5 | 10 | 10 | 5 | 10 | 0 | 0 |
| 7279 | 59 | 10 | 5 | 5 | 10 | 10 | 5 | 10 | 10 | 0 | 10 | 10 | 5 | 10 | 5 | 5 | 10 | 0 | 0 | 10 | 5 | 2 |
| 7109 | 60 | 8 | 5 | 5 | 10 | 10 | 5 | 8 | 5 | 0 | 8 | 5 | 2 | 8 | 8 | 5 | 8 | 8 | 5 | 10 | 5 | 2 |
| 7110 | 61 | 5 | 2 | 0 | 10 | 10 | 5 | 5 | 2 | 0 | 8 | 8 | 5 | 8 | 8 | 5 | 5 | 5 | 2 | 8 | 0 | 0 |
| 7280 | 62 | 10 | 10 | 5 | 10 | 10 | 5 | 10 | 5 | 0 | 10 | 10 | 5 | 10 | 10 | 5 | 8 | 5 | 0 | 10 | 8 | 8 |
| 7281 | 63 | 10 | 10 | 5 | 10 | 10 | 5 | 5 | 5 | 0 | 8 | 5 | 2 | 8 | 5 | 2 | 5 | 5 | 0 | 10 | 5 | 0 |
| 7204 | 64 | 8 | 5 | 0 | 10 | 8 | 5 | 10 | 5 | 0 | 8 | 5 | 0 | 10 | 5 | 5 | 10 | 2 | 0 | 10 | 0 | 0 |
| 7205 | 65 | 8 | 5 | 0 | 8 | 5 | 2 | 8 | 2 | 0 | 5 | 2 | 0 | 10 | 5 | 0 | 2 | 0 | 0 | 5 | 0 | 0 |
| 7206 | 66 | 8 | 5 | 0 | 8 | 5 | 0 | 8 | 5 | 0 | 5 | 2 | 0 | 10 | 5 | 2 | 5 | 0 | 0 | 5 | 0 | 0 |
| 7201 | 67 | 10 | 10 | 8 | 10 | 10 | 5 | 10 | 10 | 5 | 10 | 10 | 5 | 10 | 8 | 5 | 10 | 5 | 0 | 10 | 5 | 0 |
| 7202 | 68 | 10 | 8 | 5 | 10 | 10 | 5 | 10 | 8 | 2 | 10 | 8 | 5 | 10 | 5 | 5 | 10 | 5 | 0 | 10 | 2 | 0 |
| 7203 | 69 | 5 | 2 | 0 | 5 | 5 | 2 | 5 | 2 | 0 | 8 | 5 | 0 | 5 | 5 | 2 | 2 | 0 | 0 | 2 | 0 | 0 |
| 7224 | 70 | 10 | 5 | 0 | 10 | 8 | 5 | 10 | 5 | 0 | 10 | 8 | 0 | 10 | 5 | 2 | 5 | 0 | 0 | 10 | 0 | 0 |

TABLE 8

Soil Fungicide (PY)

At No./A

| Code No. | Ex. No. | Primary 200 | 50 | Secondary 50 | 25 | 12.5 |
|---|---|---|---|---|---|---|
| 7108 | 58 | 10 | 8 | 7 | 7 | 7 |
| 7279 | 59 | 0 | 0 | | | |
| 7109 | 60 | 7 | 7 | 7 | 6 | 5 |
| 7110 | 61 | 7 | 5 | | | |
| 7280 | 62 | 7 | 4 | | | |
| 7281 | 63 | 9 | 6 | 5 | 5 | 6 |
| 7204 | 64 | 8 | 5 | | | |
| 7205 | 65 | 3 | 0 | | | |
| 7206 | 66 | 3 | 6 | | | |
| 7201 | 67 | 8 | 4 | | | |
| 7202 | 68 | 5 | 3 | | | |
| 7203 | 69 | 4 | 0 | | | |
| 7224 | 70 | 3 | 6 | | | |

TABLE 9

Nematocide (at ppm.)

| Code No. | Ex. No. | Saprophytic 400 | 200 | 25 | Parasitic 200 | 20 |
|---|---|---|---|---|---|---|
| 7108 | 58 | 10 | 10 | 10 | 0 | 0 |
| 7279 | 59 | 80 | 30 | 10 | 10 | 0 |
| 7109 | 60 | 100 | 50 | 10 | 0 | 0 |
| 7110 | 61 | 10 | 10 | 10 | 0 | 0 |
| 7280 | 62 | 80 | 50 | 10 | 10* | 5 |
| 7281 | 63 | 100 | 100 | 80 | | |
| 7204 | 64 | 100 | 100 | 80 | 10 | 0 |
| 7205 | 65 | 50 | 10 | 10 | 8.8 | 0 |
| 7206 | 66 | 80 | 10 | 10 | 10 | 0 |
| 7201 | 67 | 100 | 100 | 80 | 10* | 0 |
| 7202 | 68 | 80 | 80 | 10 | 10* | 0 |
| 7203 | 69 | 80 | 10 | 10 | 5 | 0 |
| 7224 | 70 | 10 | 10 | 10 | 10* | 0 |

*Indicates phytotoxic

TABLE 10.—PRE- AND POST-EMERGENT HERBICIDE

| | | Oats Pre | | Post | | Sugar beets Pre | | Post | | Radish Pre | | Post | | Flax Pre | | Post | | Millet Pre | | Post | |
|---|---|---|---|---|---|---|---|---|---|---|---|---|---|---|---|---|---|---|---|---|---|
| Code No. | Ex. | 20 | 10 | 8 | 2 | 20 | 10 | 8 | 2 | 20 | 10 | 8 | 2 | 20 | 10 | 8 | 2 | 20 | 10 | 8 | 2 |
| 7108 | 58 | 3 | 0 | --- | 4 | 7 | 5 | --- | 5 | 8 | 3 | --- | 6 | 3 | 3 | --- | 5 | 0 | 0 | --- | 4 |
| 7279[1] | 59 | 5 | 5 | 4 | 1 | 3 | 5 | 10 | 6 | 5 | 6 | 6 | 4 | 2 | 3 | 7 | 4 | 9 | 9 | 7 | 4 |
| 7109 | 60 | 2 | 3 | --- | 3 | 10 | 4 | --- | 6 | 4 | 0 | --- | 4 | 0 | 0 | --- | 5 | 0 | 0 | --- | 3 |
| 7110 | 61 | 6 | 3 | --- | 4 | 8 | 2 | --- | 5 | 10 | 0 | --- | 4 | 10 | 0 | --- | 3 | 0 | 0 | --- | 3 |
| 7280[1] | 62 | 3 | 3 | 3 | 3 | 3 | 0 | 6 | 3 | 7 | 5 | 4 | 3 | 3 | 3 | 5 | 1 | 2 | 0 | 3 | 3 |
| 7281[1] | 63 | 9 | 8 | 0 | 0 | 10 | 10 | 9 | 7 | 10 | 10 | 9 | 8 | 10 | 10 | 9 | 7 | 10 | 10 | 8 | 5 |
| 7204 | 64 | 5 | 1 | 4 | 4 | 1 | 1 | 6 | 7 | 1 | 0 | 6 | 6 | 4 | 0 | 8 | 6 | 0 | 0 | 1 | 1 |
| 7205 | 65 | 1 | 1 | 1 | 1 | 1 | 0 | 2 | 3 | 0 | 0 | 1 | 0 | 0 | 0 | 1 | 0 | 0 | 0 | 0 | 0 |
| 7206 | 66 | 4 | 0 | 2 | 1 | 0 | 0 | 1 | 0 | 3 | 2 | 0 | 0 | 4 | 0 | 0 | 0 | 0 | 0 | 1 | 0 |
| 7201 | 67 | 6 | 0 | 4 | 3 | 0 | 0 | 7 | 6 | 0 | 0 | 5 | 4 | 6 | 2 | 6 | 6 | 4 | 0 | 2 | 2 |
| 7202 | 68 | 6 | 5 | 4 | 3 | 3 | 0 | 10 | 6 | 5 | 0 | 3 | 3 | 5 | 2 | 6 | 3 | 0 | 0 | 3 | 1 |
| 7203 | 69 | 0 | 0 | 1 | 1 | 0 | 0 | 10 | 10 | 0 | 0 | 4 | 4 | 4 | 0 | 3 | 4 | 0 | 0 | 1 | 2 |
| 7224 | 70 | 4 | 5 | 1 | 0 | 3 | 1 | 3 | 1 | 0 | 0 | 2 | 0 | 1 | 0 | 3 | 1 | 1 | 0 | 1 | 0 |

[1] Pre-emergent rates were 15 and 5 #/a.

TABLE 11.—SECONDARY PRE-EMERGENT HERBICIDE

| Code No. | Ex. No. | #/a. | Soybeans | Cotton | Corn | Millet | Water grass | Johnson grass | Pigweed | Wild mustard | Sugar beets | Morning glory |
|---|---|---|---|---|---|---|---|---|---|---|---|---|
| 7259 | 59 | 8 | 0 | 6 | 0 | 4 | 6 | 5 | 4 | 0 | 0 | 1 |
| | | 4 | 0 | 6 | 0 | 0 | 0 | 3 | 2 | 0 | 0 | 0 |
| | | 2 | 0 | 6 | 0 | 0 | 0 | 3 | 2 | 0 | 0 | 0 |
| 7281 | 63 | 8 | 9 | 9 | 5 | 7 | 9 | 9 | 9 | 9 | 9 | 10 |
| | | 4 | 9 | 9 | 3 | 6 | 6 | 7 | 9 | 9 | 8 | 9 |
| | | 2 | 6 | 7 | 2 | 2 | 5 | 6 | 6 | 8 | 7 | 4 |

TABLE 12.—SECONDARY POST-EMERGENT HERBICIDE

| Code No. | Ex. No. | #/a. | Soybeans | Cotton | Corn | Millet | Water grass | Johnson grass | Pigweed | Wild mustard | Sugar beets | Morning glory |
|---|---|---|---|---|---|---|---|---|---|---|---|---|
| 7201 | 67 | 4 | 6 | 8 | 5 | 5 | 3 | 7 | 6 | 5 | 6 | 7 |
|  |  | 2 | 6 | 6 | 4 | 4 | 0 | 7 | 3 | 4 | 3 | 4 |
|  |  | 1 | 4 | 5 | 1 | 3 | 0 | 5 | 0 | 0 | 1 | 3 |
| 7202 | 68 | 4 | 6 | 7 | 4 | 5 | 2 | 9 | 6 | 5 | 7 | 7 |
|  |  | 2 | 5 | 6 | 3 | 4 | 3 | 9 | 3 | 3 | 4 | 6 |
|  |  | 1 | 4 | 3 | 1 | 2 | 2 | 5 | 1 | 2 | 1 | 4 |
| 7203 | 69 | 4 | 5 | 5 | 0 | 3 | 0 | 9 | 1 | 1 | 2 | 3 |
|  |  | 2 | 4 | 2 | 0 | 1 | 0 | 8 | 1 | 1 | 2 | 2 |
|  |  | 1 | 3 | 3 | 0 | 0 | 0 | 0 | 0 | 2 | 2 | 3 |
| 7204 | 64 | 4 | 4 | 6 | 4 | 3 | 3 | 6 | 1 | 2 | 3 | 4 |
|  |  | 2 | 3 | 3 | 1 | 2 | 1 | 7 | 1 | 1 | 1 | 2 |
|  |  | 1 | 2 | 3 | 2 | 0 | 0 | 3 | 0 | 1 | 1 | 6 |

TABLE 13

Defoliant—Desiccant (at No./A)

| Code No. | Ex. No. | Defoliation | | | | Desiccation | | | |
|---|---|---|---|---|---|---|---|---|---|
|  |  | 8 | 4 | 2 | 1 | 8 | 4 | 2 | 1 |
| 7108 | 58 | 80 | 64 | 56 | 35 | 9 | 8 | 7 | 3 |
| 7279 | 59 | — | 0 | — | 0 | — | 2 | 1 | 1 |
| 7109 | 60 | 59 | 38 | 27 | 30 | 4 | 4 | 3 | 4 |
| 7110 | 61 | 0 | — | 0 | — | 0 | — | — | 0 |
| 7280 | 62 | — | 0 | 0 | 0 | — | 3 | 1 | 1 |
| 7281 | 63 | — | 0 | 0 | 0 | — | 0 | 0 | 0 |
| 7204 | 64 | 0 | — | 0 | — | 4 | — | 1 | — |
| 7205 | 65 | 0 | — | 0 | — | 1 | — | 1 | — |
| 7206 | 66 | 0 | — | 0 | — | 1 | — | 0 | — |
| 7201 | 67 | 44 | — | 17 | — | 6 | — | 4 | — |
| 7202 | 68 | 29 | — | 12 | — | 6 | — | 3 | — |
| 7203 | 69 | 0 | — | 0 | — | 2 | — | 0 | — |
| 7224 | 70 | 0 | — | 0 | — | 2 | — | 1 | — |

We claim:

1. A compound having the formula

$$(A-SSCH_2CH_2O)_2C=X$$

wherein A is selected from the group consisting of di to tetrahaloethyl and di to trihalovinyl and X is oxygen or sulfur and all halogen atoms have an atomic weight of 35 to 80.

2. A compound according to claim 1 wherein X is oxygen.

3. A compound according to claim 2 which is bis (1,2,2-trichloroethyl dithioethyl)-carbonate.

4. A compound according to claim 2 which is bis (2,2,2-trichloroethyl dithioethyl)-carbonate.

5. A compound according to claim 2 which is bis (2,2-dichlorovinyl dithioethyl)-carbonate.

6. A compound according to claim 2 which is (trichloroethyldithioethyl)-(2,2-dichlorovinyl-dithioethyl) carbonate.

7. A compound according to claim 6 which is (1,2,2,-trichloroethyldithioethyl)-(2,2-dichlorovinyl-dithioethyl) carbonate.

* * * * *